United States Patent
Abo-Hashema

(10) Patent No.: US 11,473,204 B2
(45) Date of Patent: Oct. 18, 2022

(54) METHOD AND DEVICE FOR THE PREPARATION OF ALCOHOLS FROM HYDROCARBONS

(71) Applicant: Thrunnel Ltd, Oy, Espoo (FI)

(72) Inventor: Khaled A. H. Abo-Hashema, Espoo (FI)

(73) Assignee: THRUNNEL LTD, OY, Espoo (FI)

( * ) Notice: Subject to any disclaimer, the term of this patent is extended or adjusted under 35 U.S.C. 154(b) by 0 days.

(21) Appl. No.: 16/968,973

(22) PCT Filed: Jul. 9, 2018

(86) PCT No.: PCT/FI2018/050539
§ 371 (c)(1),
(2) Date: Aug. 11, 2020

(87) PCT Pub. No.: WO2019/155113
PCT Pub. Date: Aug. 15, 2019

(65) Prior Publication Data
US 2021/0054512 A1   Feb. 25, 2021

Related U.S. Application Data

(60) Provisional application No. 62/629,132, filed on Feb. 12, 2018.

(51) Int. Cl.
*C25B 3/23* (2021.01)
*C25B 11/051* (2021.01)
(Continued)

(52) U.S. Cl.
CPC ............ *C25B 3/23* (2021.01); *C25B 11/031* (2021.01); *C25B 11/043* (2021.01);
(Continued)

(58) Field of Classification Search
None
See application file for complete search history.

(56) References Cited

U.S. PATENT DOCUMENTS

2014/0124380 A1   5/2014  Fan
2015/0292093 A1*  10/2015 Marina ................. C25B 11/077
                                                        205/343

FOREIGN PATENT DOCUMENTS

DE   102015003003 A1   9/2016
JP   2010-7152 A       1/2010
(Continued)

OTHER PUBLICATIONS

Marijke H. Groothaert et al., "Selective Oxidation of Methane by the Bis([mu]-oxo)dicopper Core Stabilized on ZSM-5 and Mordenite Zeolites," Journal of the American Chemical Society, vol. 127, No. 5, Jan. 15, 2005, pp. 1394-1395.
(Continued)

*Primary Examiner* — Wojciech Haske
(74) *Attorney, Agent, or Firm* — McCormick, Paulding & Huber PLLC

(57) ABSTRACT

A method of producing methanol from methane in which hot-electrons generated under an external electric field in a process taking place in a multi-layer heterostructure comprising a nanoporous layer drive the conversion from methane to methanol. The structure generates hot electrons by providing spatial enhancement of the electric field, and purges hot holes which are created when hot electrons depart. This combination enhances heterogeneous catalysis of the conversion reaction.

20 Claims, 10 Drawing Sheets

(51) Int. Cl.
  *C25B 11/031* (2021.01)
  *C25B 11/043* (2021.01)
  *C25B 11/075* (2021.01)
  *C25B 11/055* (2021.01)

(52) U.S. Cl.
  CPC .......... *C25B 11/051* (2021.01); *C25B 11/055* (2021.01); *C25B 11/075* (2021.01)

(56) References Cited

FOREIGN PATENT DOCUMENTS

| | | | |
|---|---|---|---|
| JP | 2013-539499 A | 10/2013 | |
| JP | 6065773 B2 | 1/2017 | |
| WO | 2011046621 A1 | 4/2011 | |
| WO | 2015069352 A1 | 5/2015 | |
| WO | 2017001891 A1 | 1/2017 | |

OTHER PUBLICATIONS

Dinesh Kumar et al., "Ultrafast and Efficient Transport of Hot Plasmonic Electrons by Graphene for Pt Free, Highly Efficient Visible-Light Responsive Photocatalyst," Nano Letters, vol. 16, No. 3, Feb. 8, 2016, pp. 1760-1767.
International Search Report for PCT Application No. PCT/FI2018/050539 dated Nov. 9, 2018.
Indian Office Action and its English translation for corresponding Indian Application No. 202047035910 dated Feb. 15, 2020.
Notification of Reasons of Rejection for Japanese Patent Application No. 2020-542230, dated Jun. 15, 2022 and its English translation.

* cited by examiner $O_{EF}$ = Extra-Framework oxygen; $O_F$ = Framework
SP = Side Pocket; BAS = total Brønsted acid

METHOD AND DEVICE FOR THE PREPARATION OF ALCOHOLS FROM HYDROCARBONS

CROSS REFERENCE TO RELATED APPLICATIONS

This application is a National Stage application of International Patent Application No. PCT/FI2018/050539, filed on Jul. 9, 2018, which claims priority to U.S. patent application Ser. No. 62/629,132 filed on Feb. 12, 2018, each of which is hereby incorporated by reference in its entirety.

TECHNICAL FIELD

The present invention relates to the production of alcohols from hydrocarbons utilizing hot-electron-driven conversion under ambient conditions and in a scalable manner. More specifically, the invention relates to a process and a multilayer heterostructure comprising a nanoporous layer to generate hot electrons under an external electric field.

The present invention fills a long standing gap in the energy industry.

BACKGROUND

The 'valorization' of methane, i.e. large-scale direct methane to methanol (DMTM), catalytic conversion under economically feasible and environmentally benign conditions has been regarded as one of the key challenges in contemporary catalysis. According to Nobel Prize laureate Sir Derek Barton, this challenge constitutes a 'Holy Grail in Chemistry'. While methane is an inert compound and, by virtue of being a gas, is not shippable, the versatility of methanol, which has a ~1000-fold higher density than methane, as a chemical feedstock is quite unique. Moreover, methanol is completely miscible in most reaction solvents, compared to poor solubility of methane due to its gaseous property. Examples of the variety of chemicals to which methanol can be industrially converted are shown in FIG. 1.

Natural gas is the world's most abundant petrochemical resource, of which methane is the main component (up to ~95-97%, depending on the origin). Natural gas reserves are estimated at around 197-208.4 trillion $m^3$ (i.e. ~7000 trillion $ft^3$), and this figure will likely continue to increase with discoveries of new deposits. This is in addition of the larger resource base of unconventional sources such shale gas, estimated at ~215 trillion $m^3$ (i.e. ~7600 trillion $ft^3$), tight gas, coal bed methane, and methane hydrates, which has been more difficult and costly to exploit than conventional deposits. Most of these abundant energy resources are stranded without economically viable paths to market because (1) natural gas has too low density (0.75 $Kg/m^3$ at 20° C.) to be shippable in its gaseous form or to be stored in aboveground facilities similar to those used for oil; and (2) not all natural gas fields are economically viable to exploit especially for remotely located small fields where turnover does not justify the fixed-cost intensive capital investment required for natural gas projects. Even for exploited Natural Gas (NG) fields, only 71% of the NG is captured, 16% is flared for technical reasons and 13% is flared due to cost-imposed limitation of takeaway capacities (~$14 billion worth of natural gas is inevitably burnt every year worldwide "burned money").

Moreover, as storage capacities for methane, in its natural gaseous state is very limited, wasteful flaring of methane becomes inevitable. So, in the absence of pipeline labyrinth, as a means of transportation that is restricted by geographical barriers, safety and economic considerations; natural gas must be converted to a shippable liquid form. Currently there is no industrial cost-effective technology to direct natural gas to liquid conversion. That forced the industry to take on two far-from-ideal economically demanding routes, namely, the Liquefied Natural Gas (LNG) route, and the multistep indirect conversion of methane to methanol through syngas production.

LNG is natural gas (methane), liquefied by cooling it to −162° C. (−260° F.) under 20 atm, and thus is ~624-fold more dense (i.e. ~468 $Kg/m^3$). That made it possible to transport natural gas in a liquid form to places that are beyond the reach of pipeline systems. That process of LNG demands massive infrastructure where liquefaction plants typically take 10 years to develop from concept to production, including 4 years for site construction and the cost is typically amortized over 20 years. That is, for LNG plant to be economical, the operator has to have a committed and sufficient natural gas resource to ship for at least 20 years. Moreover, LNG process does not create any value-addition, because LNG will be re-gasified (i.e. converted back to gas) in the receiving terminal.

An alternative and more expensive route to LNG is to indirectly convert methane (natural gas) to methanol (liquid) through burning and reforming of methane to synthesis gas (Syngas), which is a mixture of hydrogen, carbon monoxide and carbon dioxide. Those gas products are then steam-reformed to reach $CO/H_2$ ratio of 1:2, to be combined to form methanol. Syngas production is a multistep processes requiring expensive feed preparation, reactors and separation units and the reactions themselves are done under severe harsh conditions of high temperature (up to 900° C.) and pressure (up to 100 atm). All sort of attempts were made to find ideal catalysts but, despite many unconfirmed claims in literature, catalysts did not appear to offer meaningful yield advantages except for reducing the severity of process conditions. Syngas operation is economically feasible only on very large scales, which leaves small to medium fields of natural gas inoperable. Syngas-based methanol production is currently the only industrial operation to convert methane to methanol. However, that process has mediocre performance characteristics of methanol yield and selectivity of 5.5% and 80%, respectively. This is the performance standard that any prospective DMTM must overtake to be economically feasible. Some better results were reported but never reproduced; thus, poor reproducibility is one of the most serious problems in the controlled partial oxidation of methane.

An additional challenge when using catalysts to partially oxidize methane is that unlike $CO_2$, which has a quadrupole moment and can be captured both physically and chemically in a variety of solvents and porous solids, methane is completely non-polar. Thus, it interacts very weakly with most materials. When metal oxides were used as catalysts, methane did not adsorb significantly on those oxides as would be the case in classical catalytic sequence, which starts with non-dissociative or dissociative adsorption of a reactant on the catalyst. Instead, methane molecules collided with the surface and thus the reaction becomes unselective. Also, extensive screening studies found that methane solubility is too low in liquid solvents, including ionic liquids. Therefore, systems that utilize catalysts in an aqueous phase suffer from mass transfer and diffusion limitations. This is opposite to the platform used by nature, where in the case of methanotrophs, methane is readily soluble in the lipid membrane and thus efficiently captured and oxidized by those organisms.

Attempts were also made to convert methane at ~700° C. to liquid aromatic compounds (i.e. benzene, toluene, and xylene (BTX)), through non-oxidative Methane DehydroAromatization (MDA). Most innovations in that direction were focused on using steam to remove the coke (carbon buildup), which forms during the reaction and clogs the catalyst bed, and use of Dense Ceramic Catalytic Proton-Conducting Membranes to extract hydrogen, which otherwise would cause negative feedback inhibition of the reaction. The yield, conversion rate and technoeconomic process viability for MDA is still dubious, and moreover, benzene is not as versatile and effective a chemical feedstock as methanol.

Methanol, as a liquid fuel, does not require cooling at ambient temperatures or costly high pressure infrastructure and can be used with existing storage and dispensing units. However, the economic benefit of DMTM conversion goes beyond creating viable paths to market by effectively and efficiently transforming natural gas into a shippable commodity and thus removing the barriers between natural gas supply and demand. DMTM will also lower the economic entry barrier to commercialize small to medium size and remotely located natural gas fields, which are currently technologically and economically inoperable. An additional advantage will be to expand the techno-economic value of methane, beyond its current primary use as a cheap fuel. Methane as an inert compound, is not by itself a useful chemical feedstock. Methanol, on the other hand, is the most versatile synthetic fuel and chemical feedstock. Methanol (but not methane) is suitable to be fed into reactor chambers as a starting material in diverse chemical processes and a precursor for other types of liquid fuels. If DMTM becomes a successful operation at a new low cost, methanol is expected to replace current, more expensive feedstock compounds such as ethylene and propylene, to produce chemicals including acetic acid, acetaldehyde, ethanol, ethylene glycol, styrene, and ethylbenzene, and various synthetic hydrocarbon products. Furthermore, methanol is also an excellent carrier of hydrogen fuel. The absence of C—C bonds in methanol facilitates its transformation to pure hydrogen with 80 to 90% efficiency.

Direct methane to methanol (DMTM) conversion under ambient conditions, starting with effective methane functionalization, has been long considered as an impossible reaction. The present invention provides a direct conversion path from methane to methanol to address the triple constraints of time, cost and efficiency of the current practice to convert methane into liquid. The techno-economic enhancement of conversion of methane to methanol under the present invention as opposed to the current process is shown in FIG. 2.

The present invention fills a non-obvious gap existing in prior art, in the almost disconnected fields of biochemistry, solid-state physics and quantum physics and chemistry. This invention presents novel hot electron-activated enzyme-like catalytic pockets in a platform for selective oxidation/reduction (redox) processes as exemplified by selective oxidation of methane to methanol under ambient conditions and in a manner that emulates the same process in nature. Those catalytic pockets are embedded in certain types of zeolites or carbonaceous supporting materials that resemble the polycrystalline (multicrystalline) nature of zeolite membranes and the anisotropic internal structure of the zeolite pore systems. Current state-of-the-art technologies are unable to emulate the efficiency and selectivity of mediating a single-step oxidation of $CH_4$ to $CH_3OH$ as done in nature by the methane monooxygenase (MMO) enzymes under ambient conditions. Therefore, the present invention possesses the potential to overcome the inability of prior art to meet the industrial standard for that conversion.

Despite the ostensible (but evident) impossibility of efficient man-made DMTM operation, nature has found not one, but three solutions to directly convert methane to methanol. Nature has managed to produce methanol as the main product from methane as demonstrated in two biological systems (operated by soluble methane monooxygenase (sMMO) and particulate MMO (pMMO), found in methanotrophic bacteria, and one cosmological system. The effect of cosmic rays on the formation of methanol from methane in interstellar medium (ISM) has been replicated in the laboratory by electron irradiation of mixed $H_2O$ and $CH_4$, where H-atom tunnels out of methane under vibration-assisted tunneling. In those nature's three solutions, two chemical bonds are efficiently broken, the bond holding the two oxygen atoms together, and the extremely strong carbon-hydrogen (C—H) bonds in methane. We stumbled over the possibility that the three solutions adopted by nature for DMTM may share a common denominator. That is the transfer of atoms in the DMTM conversion processes adopted by nature is done by quantum tunneling rather than conventional activation or thermal excitation. In fact, the tunneling rate of hydrogen atom increases as the temperature decreases, which would be classically an impossible behavior, except that we are dealing with quantum mechanics where scattering (a function of temperature) of tunneled particles plays a role.

The biologically catalyzed methane to methanol reaction, which has been coveted by the industry for decades, is shown in FIG. 3.

All industrial exploitations of methanotrophs (a.k.a. methanophiles) have failed. Whole-cell biocatalysis has proven to be inexorably limited by low-throughput unit operations with mass transfer limitations. Moreover, MMOs are not amenable to standard immobilization techniques and the enzyme resisted all cultivation attempts for industrial purposes. That was attributed to the fact that both the soluble MMO (sMMO) and membrane bound particulate MMO (pMMO) are multimeric/multisubunit scaffold enzymes. sMMO and pMMO perform the same function, i.e. to coordinate the reactivity of four substrates (hydrocarbon, oxygen, electrons, and protons) to produce methanol from methane. Nevertheless, they differ structurally, mechanistically, and more perplexedly they differ in the active site configuration and metal co-factors. The active site in sMMO contains a di-iron center bridged by an oxygen atom (Fe—O—Fe), and the active site in pMMO utilizes copper. We, as the rest of scientific community, were stunned by the concept that nature could use two different metal ions, iron and copper, for the same catalytic task. In a classical MMO reaction, two reducing equivalents from NAD(P)H are utilized to split the O—O bond of $O_2$. Then, one oxygen atom is reduced to water by a 2 $e^-$ reduction and the second is incorporated into methane to yield methanol.

DMTM reaction is the key to true valorization of natural gas. Thus, the energy/chemical industry has been pursuing it for several decades without true industrial success apart from nurturing the academic interest of the problem. Prior art includes considerable amount of synthetic work in the literature that led to successful structural mimics of the active site of MMO. Analogy between the active sites in Fe and Cu-exchanged zeolites and the proposed active sites in soluble (sMMO) methane monooxygenase is shown in FIG. 4. Nevertheless, those biomimics were seriously inferior to the performances of their natural precedent, i.e. MMO, to the extent of being non-functional or almost so. That past failure was mainly due to the fact that the active site of MMO is not a conventional one, but rather an "entatic" site. It is called so because of its "strained" state of unusual energy, where the active metal shuttles between multiple spin and valence states, which seemed to be impossible to replicate artificially. The present invention bestows upon those biomimics that "unusual" state of energy by empowering those biomimics with a source of highly energetic electrons. Thus, the present invention transforms those ineffective biomimics into a potent catalyst with the potential to even rival the natural enzyme.

The reaction $CH_4 + \frac{1}{2} O_2 \rightarrow CH_3OH$ is described as a dream reaction, because it requires the provision of two opposing simultaneous thermal conditions, which is physically impossible. Low "ambient" temperature to favor the formation of methanol as an end product, and high temperature (several hundred Celsius degrees) to surmount the high activation energy barrier. High thermal energy (usually c.a. >500° C.) is required to be added into the reaction to overcome that activation energy barrier. However, the addition of that thermal energy will inevitably cause the thermodynamics of the reaction to shift towards side reactions (e.g. $CH_4 + \frac{1}{2} O_2 \rightarrow CO + 3H_2$ and eventually the stoichiometric reaction: $CH_4 + 2O_2 \rightarrow CO_2 + 2H_2O$), over the target reaction of $CH_4 + \frac{1}{2}O_2 \rightarrow CH_3OH$. No man-made catalyst has ever been made that can lower the activation energy enough for the reaction to occur at room temperature at an acceptable rate. Moreover, there is a spin dilemma; this is because $CH_4$ and $CH_3OH$ possess singlet ground states, then the reaction is spin-forbidden when $O_2$, whose prevalent spin state is the triple state, is used as terminal oxidant. This invoked sporadic attempts based on the concept of Two-State Reactivity (TSR), where reactants go through spin inversion/transition utilizing earth abundant first-row transitions metals and element oxide radical ions that exhibit, without exception, high spin densities at a terminal oxygen atom. It has been shown that, in sMMO, nature utilizes high-valent iron(IV)-oxo clusters, contained in the so called compound Q, known to be the most powerful oxidant found in nature, to bring about the C—H activation processes, where Fe(IV)-oxo moieties change between S=1 and S=2 spin states. Despite those attempts to biomimic nature, to date, no man-made catalyst can efficiently convert methane ($CH_4$) and oxygen ($O_2$) directly into methanol ($CH_3OH$) at low temperature. For more than 100 years, the selective oxidation of this simple alkane has remained unsolved.

Methane oxidation is extremely difficult chemistry to perform in the laboratory because the C—H bond in $CH_4$ has the highest bond energy of 104 kcal/mol (435 kJ/mol) amongst organic substrates. Methane, with its perfect tetrahedral structure, is a highly thermodynamically stable alkane with a noble gas-like electronic configuration. It has negligibly small (if not negative) electron affinity, large ionization energy (12.5 eV), huge HOMO-LUMO gap (low-lying highest occupied molecular orbital (HOMO) and high-lying lowest unoccupied molecular orbital (LUMO)) and extremely high pK value. In the $CH_4$ molecule, one hydrogen s-orbital gets pushed down in energy (stabilized) and bonds with the carbon s-orbital. The other three hydrogens bond with the p-orbitals. Only bonding orbitals are filled (no anti-bonding orbitals), so the molecule is very stable. $CH_4$ has been regarded as the weakest proton acid in the gas phase until 2008, when the ion LiO— was found to be a slightly weaker acid (stronger base) than methane.

Although several reports exist on the activation of C—H in methane, i.e. converting methane to methyl derivatives at low temperature, such methods are still far from being practical. When the reaction is done at lower temperature, usually that is compensated for by higher pressure, or using metal oxide structures that allow for the formation of the so called "highly reactive" α-oxygen "surface" sites that are formed on iron sites on Fe-zeolites or catalysts with similar reactive oxygen centers of small metal-oxo clusters.

The catalytic pockets of MMOs are structurally characterized by di-metal center bridged by oxygen and functionally characterized by different spin and oxidation states of the metal center. Those structural and functional characterizations were the target of the present invention to produce an efficient artificial analog to that biological system to produce methanol from methane. However, we didn't fall into the temptation of linking structure to function, which is mainly based on classical mechanics or electrostatic, because MMO is an unconventional enzyme where structure and function are not tightly linked. This is based on two facts. Firstly, the deuterium kinetic isotope effect (KIE) for the MMO-catalyzed reaction is 50-100, which is possibly the largest observed for any biological system. That is, unlike classical enzyme reactions, the MMO-catalyzed reaction is temperature-independent. In other words, this is a tunneling enzyme that catalyzes a reaction that does not proceed classically (over the energy barrier) but rather by tunneling through, under, or by-passing the barrier, which makes the reaction temperature-independent. Secondly, highly related enzyme members (e.g. butane monooxygenase) and similar synthetic structures could not produce the function performed by MMO. It seemed to us that the protein backbone of MMO is crafted in such way to use vibrations, based on not just the active site but rather whole protein dynamics, to direct high energy in a specific direction to aid the transfer of proton from methane (via tunneling) with simultaneous addition of an OH group to form methanol. In that case the enzyme is expected to exhibit an electronic wave function with enzyme molecular orbitals being highly localized at the binuclear active center. Such co-localization of frontier enzyme molecular orbitals with enzyme catalytic sites is documented. The structure designed in the present invention includes bimetal centers bridged by oxygen that are structurally similar to the catalytic centers in MMO. However, that alone couldn't reproduce the enzyme function. In order to achieve that, the present invention provided an electronic mean to generate a cloud of hot electron propagating through those catalytic centers into the molecular orbital of methane to weaken the C—H bond, enough to be cleaved. This is the same effect produced by the enzyme via vibrationally enhanced tunneling as a mechanism for enzymatic hydrogen transfer.

Those hot electrons are then used for hot electron-based reductive activation of catalytic pockets of μ-oxygen-bridged metal atoms, preferably in copper or iron-exchanged zeolites or similar carbonaceous supporting porous materials. Those now-activated artificial pockets simulate the catalytic action of analogous pockets in the enzyme methane monooxygenase (MMO), which uniquely, selectively, directly and efficiently converts methane (gas) to methanol (liquid) in ambient conditions. This catalytic function has captivated the energy industry since the 1920s in connection with the emergence of Direct Methane To Methanol (DMTM)-based industrial aspirations. Nevertheless, that captivating reaction couldn't be truly mimicked by any of the man-made catalysts. This left the industry with the lengthy Fischer-Tropsch (F-T) multi-step-based synthesis, developed by Franz Fischer and Hans Tropsch in 1923, as the only commercially proven process to make methanol from methane "expensively". In F-T, methane must be first burnt and reformed to CO and $H_2$ prior to making methanol.

The present invention fills a gap that existed in the prior art technologies, which were unable to emulate the efficiency and selectivity of mediating a single-step oxidation of $CH_4$ to $CH_3OH$ as done in nature by the methane monooxygenases (MMO) in ambient conditions. Therefore, the present invention possesses the potential to overcome the inability of prior art to meet the industrial standard for that said conversion.

Definitions

μ-oxygen: (pronounced, 'mu' oxygen) describes a coordination complex wherein a single oxygen atom (i.e. ligand (L)) bridges two metals (M). Sometimes, the character 'mu', μ, is followed by a subscript number denoting the number of metals bound to the bridging ligand. In our case $\mu_2$ is denoted simply as μ (M-μ-M).

η ('eta'): The η-notation denotes the hapticity of the ligand, which is the number of atoms (denoted by a superscript following "η") in the ligand bonded to the metal center. In our case, where methane is treated as a ligand coordinated to the metal center in our heterostructure, the binding of methane is $\eta^2$ or $\eta^3$ type (i.e. via 2 or 3 coordination hydrogen atoms). This is done through an Agostic interaction where the two electrons involved in the C—H σ bond enter the empty d-orbital of a transition metal.

α-oxygen, $O_\alpha$, or (α-oxygen): is a catalytic surface chemisorbed oxygen ($(O)_{ad}$, a.k.a. adatom) radical anion ($O^{-\cdot}$) with specific orientation on specific surface metal sites (e.g. $(Fe^{II})_\alpha$) formed in metal-doped porous materials (e.g. carbonaceous support such as some metal-exchanged zeolites). α-oxygen sites are formed when oxygen vacancies promote the dissociative adsorption of $O_2$ resulting in the formation of monovalent oxygen species, $O^{-*}$. In comparison, the divalent oxygen species, $O^{2-}$ and $O_2^{2-}$, also known as β oxygen, are associated with the partially reduced β site cations, which is more selective for Oxidative Coupling of Methane (OCM) to ethylene rather than the partial oxidation of methane to methanol. β sites are formed when oxygen vacancies are reduced, for example by halide ions doping into perovskite, which then partially substitute $O^{2-}$ or occupy oxygen vacancies.

α-oxygen sites are traditionally formed by re-oxidizing $(Fe^{II})_\alpha$ complexes, which are chemically stabilized in the metal-exchanged zeolite matrix. That re-oxidation of $(Fe^{II})_\alpha$ in zeolites by $O_2$ is thermodynamically unfavorable even at 700-900° C. Nevertheless, molecules of nitrous oxide achieved that oxidative task upon its decomposition on steamed zeolite or high temperature (200-250° C.) treated zeolite, generating a highly active radical oxygen species (α-oxygen, $O_\alpha$): $[(Fe^{II})_\alpha + N_2O \rightarrow Fe^{III}—O^{-*})_\alpha + N_2]$.

Judged by successful conversion of methane to methanol, α-oxygen in the present invention is likely formed in ambient conditions under the ballistic action of highly energetic electrons.

τ ('tau'): denotes lifetime of hot electrons $e^{hot}$: Hot electron $e^-_{aq}$: Hydrated electron M/P-M/I/Z: is a cathodic heterostructure, arranged in layer-by-layer deposition in the following order from back to front: Metal/(P-type-like) Semiconductor-Metal/Insulator/Zeolite or zeolite-type carbonaceous material, where the P-type-like semiconductor can be any material with a wide-band-gap.

$NiO_x$ denotes non-stoichiometric NiO and $Ni_2O_3$ mixture with more excess oxygen confirmed due to the larger $Ni_2O_3$ to NiO ratio (i.e. larger $Ni^{3+}$ to $Ni^{2+}$ ratio). The excess of oxygen atoms in NiOx creates vacancies in the normally occupied Ni cation sites resulting in a more p-type semiconductor like-behavior.

Hot electron-based quasi chemical looping: In the present invention, "chemical looping" applies to the use of a metal with variable oxidation states (such as iron or copper), doped into porous material (such as zeolites), to transfer oxygen from air or water for the partial oxidation of methane. In this cyclic redox scheme, the reductive pathway is mediated by hot electrons, and the oxidative pathway is mediated by hydrogen peroxide, hydroxyl radical and/or superoxide anions produced upon the interaction between energy-tunable hot electrons and water. The term chemical looping is used in the present invention to describe a cyclic process where oxygen is delivered indirectly through oxygen carrier material such as metal oxide or lattice oxygen from a redox catalyst. Basically, in a traditional "chemical looping" reaction, particles of metal are recycled between oxidation reaction compartment and reduction reaction compartment. That is, metal particles are oxidized by air-oxygen to form a metal oxide, which is transported to the combustion furnace to oxidize the fuel, producing $CO_2$, and get converted back to pure metal to finish once cycle and restart another. So, the intermediates in the chemical looping reactions are mainly metal oxides. The concept of chemical looping is rooted in the second law of thermodynamics as applied to the reduction of process irreversibility and hence the enhanced energy efficiency of the process.

The term transition metal covers outer transition metals (e.g. Fe and Cu) and inner transition metals such as Ce, which exhibit variable oxidation states.

SUMMARY

According to a first aspect of the invention, there is provided a method for converting methane to methanol, comprising the steps of: providing a structure comprising a multi-layer cathode having a backside and a front side, said cathode comprising the following layers in the following order from the backside towards the front side: a conductive metal layer, a wide-band gap layer, a cathodic conductive layer, an optional insulator layer, and a porous support layer incorporating catalytic transition metal centres; an anode positioned at a distance from and facing the cathode front side; a first node conductively connected to the cathodic conductive layer and a second node conductively connected to the anode; applying a first bias voltage to the first node and a second bias voltage to the second node, generating hot electrons; directing said hot electrons towards the porous support, conveying a stream comprising methane to the porous support, and recovering methanol from a stream leaving the porous support.

In an advantageous embodiment of the method, the structure comprises an additional electric circuit comprising a node conductively connected to the backside conductive metal layer, and a negative bias voltage is applied to that node, causing the shuttling of holes, whereby that negative bias voltage is provided by a voltage source having a negative end connected to the backside conductive metal layer and a positive end connected to a ground potential or to the anode.

In a further advantageous embodiment of the method, the metal in the catalytic transition metal centres are Fe, Cu or mixtures of these, and the transition metal atoms in said centres are pairwise bridged by an oxygen atom during operation.

According to a second aspect of the invention there is provided a device for converting methane to methanol, the device comprising a multi-layer cathode having a backside and a front side, said cathode comprising the following layers in the following order from the backside towards the front side: a conductive metal layer, a wide-band gap layer, a cathodic conductive layer, an optional insulator layer, and a porous support layer incorporating catalytic transition metal centres; an anode positioned at a distance from and facing the cathode front-side; means for conveying a stream comprising a hydrocarbon to the porous support; and means for recovering product from a stream leaving the porous support.

In an advantageous embodiment of the device according to the invention, the device further comprises an electric circuit comprising at least one cathode terminal conductively connected to the cathodic conductive layer and at least one anode terminal conductively connected to the anode.

In a further advantageous embodiment of the device according to the invention, the device further comprises an additional electric circuit comprising a node conductively connected to the conductive metal layer.

Further advantageous embodiments are defined in the dependent claims.

DETAILED DESCRIPTION

Figure 1:
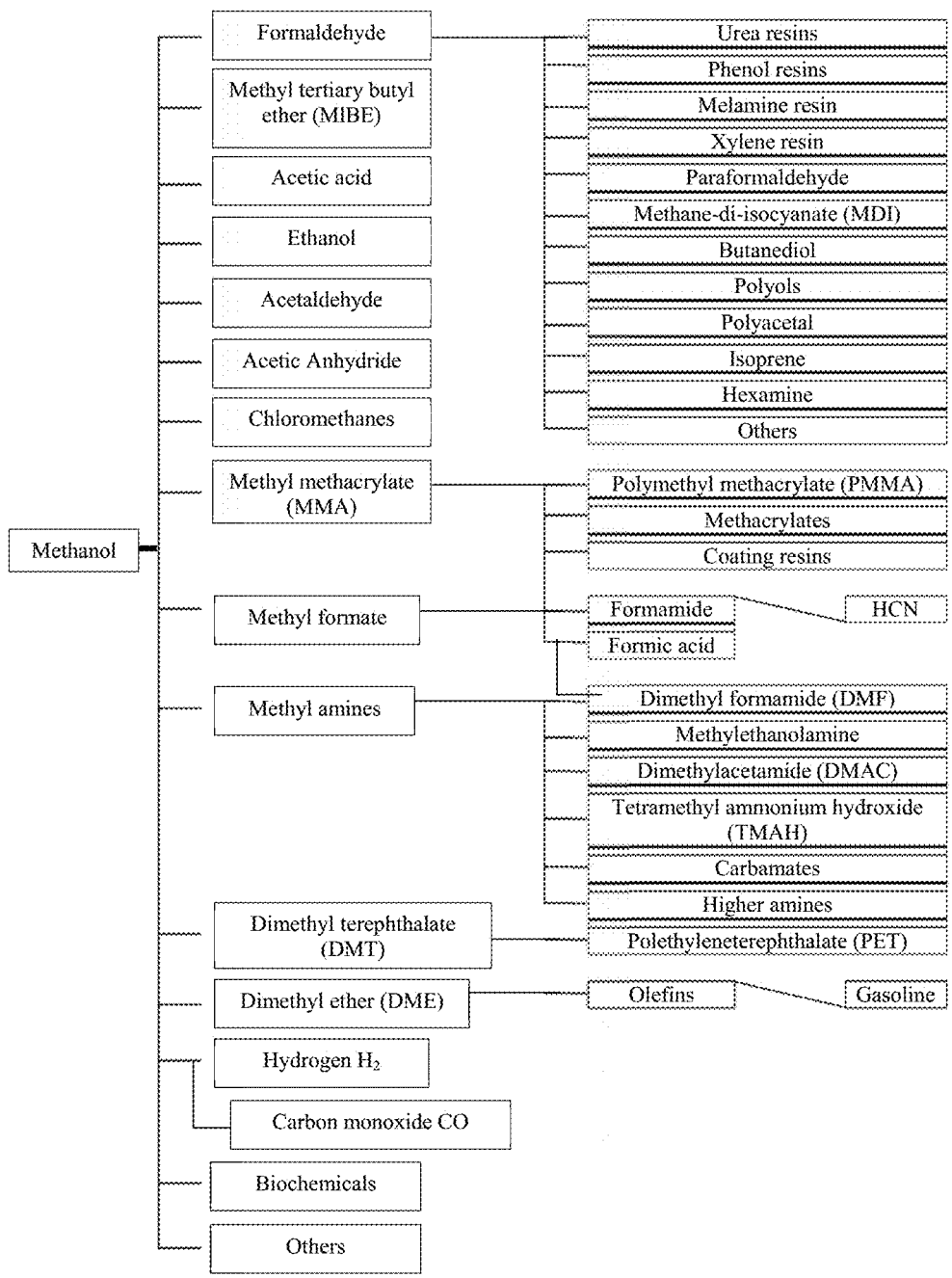
FIG. 1 is a table of examples of the variety of chemicals to which methanol can be industrially converted.
Figure 2:
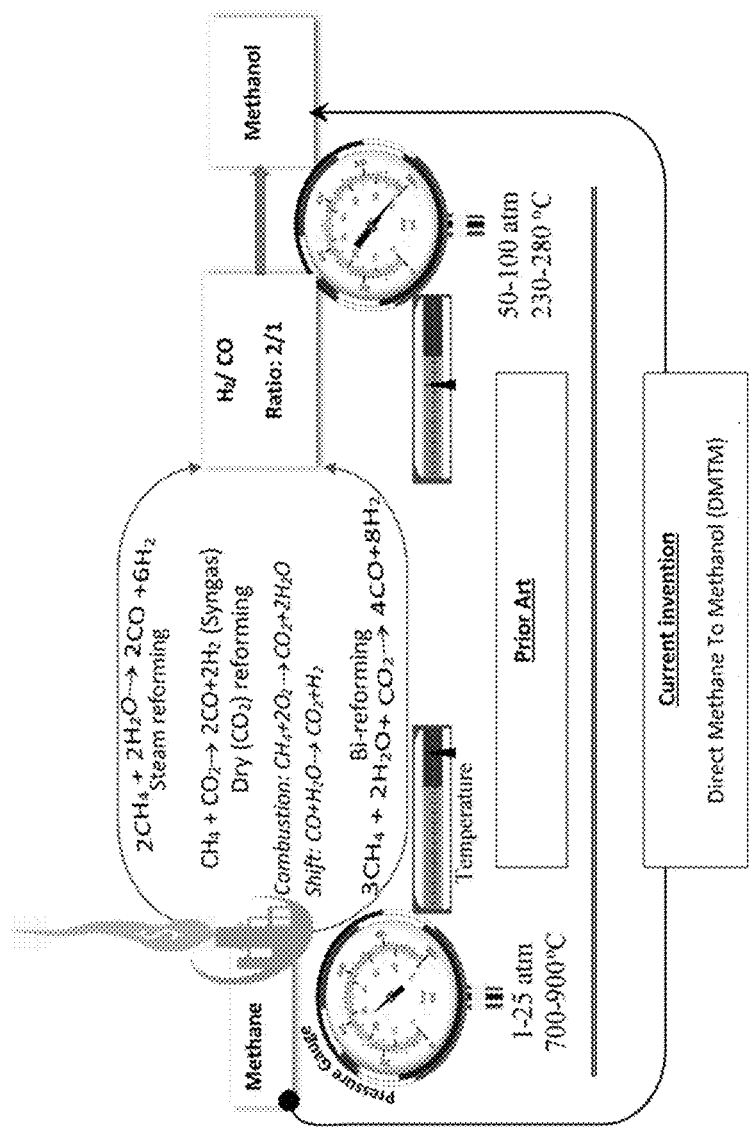
FIG. 2 is a compilation of prior art methods to convert methane to methanol and a comparison to the direct conversion path of the present invention.

The invention is described in detail below with reference to the appended drawings. FIGS. 1-2 are discussed above in connection with the technical background.

Figure 3:
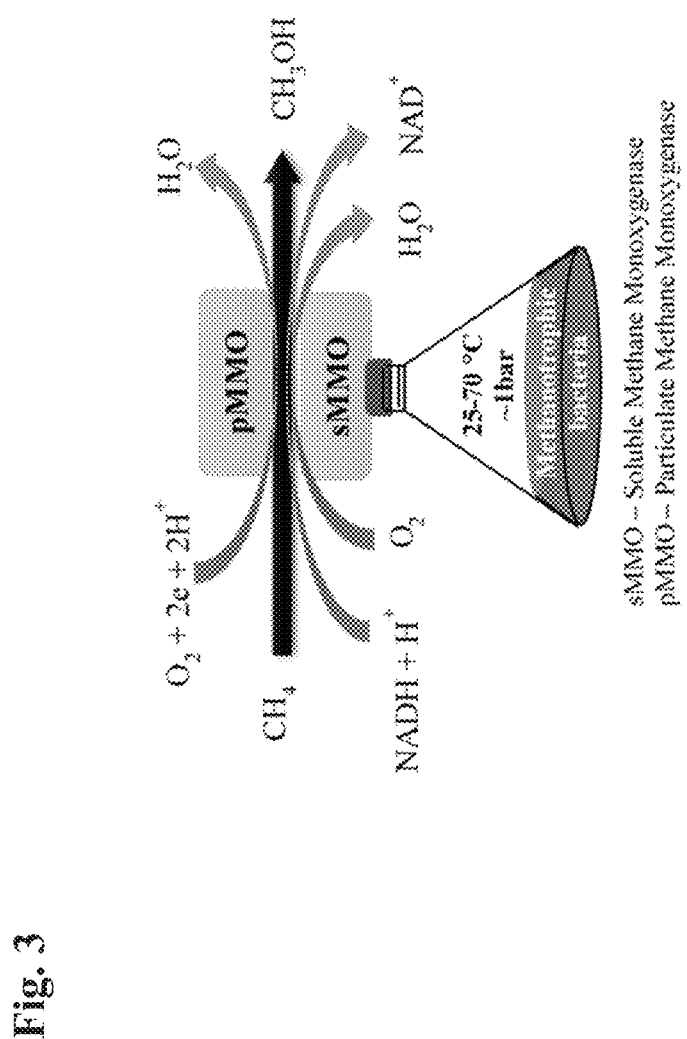
FIG. 3 illustrates the DMTM reaction as catalyzed by methane monooxygenase, FIGS. 4 A to C illustrate the analogy between the active sites in Fe and Cu-exchanged zeolites and the proposed active sites in particulate (pMMO) and soluble (sMMO) methane monooxygenase.

FIG. 3 is a schematic representation of the DMTM reaction as catalyzed by methane monooxygenase, which has been proven to be unindustrializable enzyme.

Figure 4B:
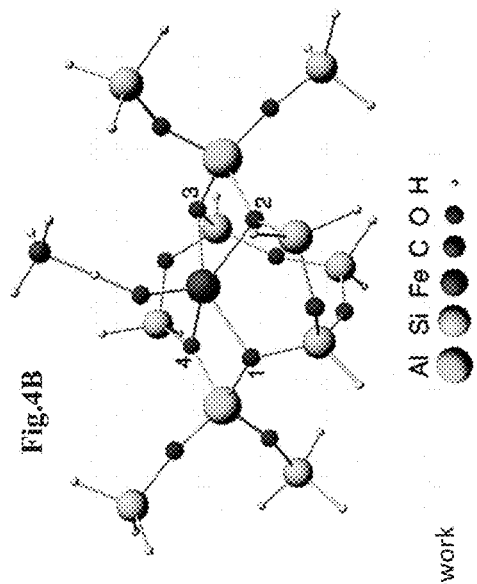
Figure 4A:
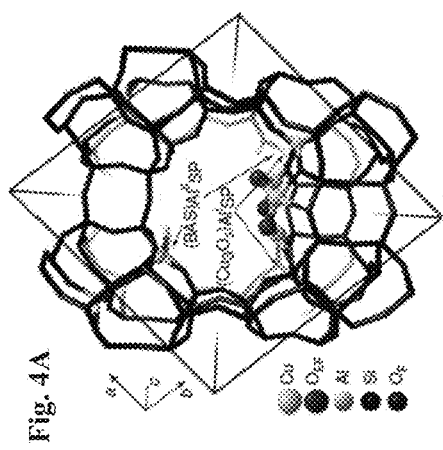

FIGS. 4 A-C show the analogy between the active sites in Fe and Cu-exchanged zeolites and the proposed active sites in particulate (pMMO) and soluble (sMMO) methane monooxygenase as follows:

FIG. 4A is a view of copper-exchanged mordenite (MOR) zeolite showing the schematic structure and location of a $[Cu_3(\mu\text{-}O)_3]^{2+}$ cluster predicted by Density Functional Theory (DFT). The zeolite model contains paired (type I) and isolated (type II) Al atoms located at the pore mouth of the Side Pocket (SP). The "protonic" cluster is stabilized by two anionic centers due to $A^1{}_{SP}$ lattice sites at the entrance of the MOR side pocket, so that the extra-framework oxygen anions responsible for the initial C—H activation are pointing towards the main channel of MOR. The active site is the ring-type active site $[Cu_3(\mu\text{-}O)_3]^{2+}$ extraframework cluster, in which the positive charge is balanced by two Al sites of the zeolite framework is analogous to a similar active site, which has been proposed for pMMO. Dicopper and polynuclear $Cu_xO_y$ (x=1-5) sites have also been proposed as possible catalytic sites responsible for methane.

FIG. 4B shows Fe exchanged ZSM-5 (α-oxygen), most likely incorporating the ferryl ion ($FeO^{2+}$), which is analogous to the active center of sMMO.

Figure 4C:
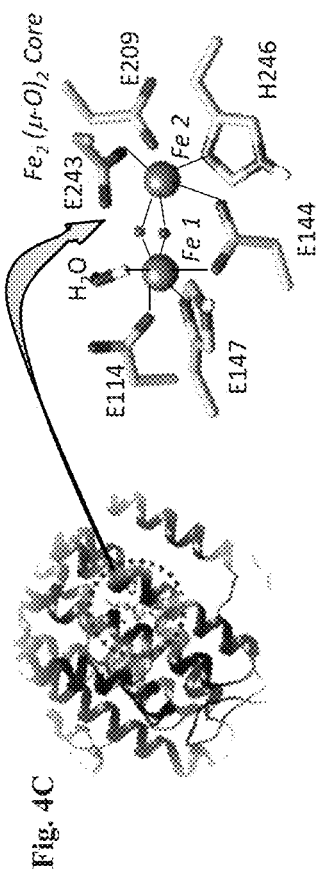

FIG. 4C is a schematic representation of the hydroxylase component of MMO di-μ-oxo Diamond Core ($Fe_2(\mu\text{-}O)_2$), where two single oxygen atoms (retained from $O_2$) are the bridging ligands, denoted by the symbol μ.

The present invention embodies a structure to generate highly energetic electrons (a.k.a. hot electrons) with a longer lifetime than that described in contemporary and prior art by providing spatial enhancement of electric field and incorporating a structure that purges the "hot" holes, which are created upon the departure of energetic electrons. Thus, electron-hole recombination is prevented, which allows for a more sustainable generation of hot electrons, under an enhanced electric field, to exert their induction role in the catalytic oxidation of methane to methanol.

The combination of spatial enhancement of electric field-based induction of hot electrons and hole-scavenging capacity allowed for the use of hot electrons to substantially enhance heterogeneous catalysis, which is the main subject of the present invention.

Hot electrons ($e^{hot}$), have been in shown in the prior art to possess "non-thermal" kinetic energy that is much higher than the lattice temperature (hence the term "hot") but yet they are not in thermal equilibrium with their metal atoms. The term 'hot electrons' denotes a non-equilibrium ensemble of highly energetic carriers (near Fermi level). The non-equilibrium status of hot-electron (non-equilibrium electron ensembles) was first described in semiconductors. This hot-electron characteristic has since then been observed in metals and superconducting systems.

Hot electrons (a.k.a. energetic electrons) generated in the current invention are used to trigger DMTM conversion.

Hot electrons are generated when external energy (e.g. photoenergy from a light source, such as a laser or electric field) is forced directly into the system at a threshold rate that is higher than the rate of energy flow out of that system (e.g. as a consequence of having a "dielectric" insulator or vacuum in the path of an electric current). Another source of that external energy that triggers the generation of hot electrons is the excess energy of an exothermic chemical reaction, which when released on the surface, triggers non-adiabatic electronic excitation, resulting in the flow of energetic electrons with an energy of 1-3 eV on a short (femtosecond) time scale before atomic vibration adiabatically dissipates the energy (in picoseconds). In the process of generation of hot electrons, the kinetic energies of a fraction of carriers go up, 'heat up', and their velocity distribution deviates significantly from the equilibrium Maxwellian form. Those energetic electrons will now have enough energy to tunnel though the energy barrier at the heterojunction (e.g. metal/insulator or metal/semiconductor junction), which could not be classically surmounted or crossed. If those tunneled electrons hit the conduction band edge of the insulating layer, they gain energy in the electric field of that conduction band. However, they also lose some energy due to inelastic scattering in the dielectric layer whose electric density is high. Those hot electrons follow a Fowler-Nordheim tunneling mechanism, which can be considered as a multi-step direct tunnel via traps in the dielectric layer. In fact, charge transport in dielectrics is governed by traps, where the oxygen vacancies (in silicon oxide) act as electron traps. Under an external electric field, when the trap density is high and the distance between them is short, trapped electrons (or holes) can tunnel between the neighboring traps without ionization to the conduction band. Since those neighboring traps have different energy levels, tunneling of electrons between those traps is accompanied by inelastic processes (scattering) to compensate for the energy difference. So, it is best for our purpose for hot electrons to bypass the dielectric layer completely. If the insulating layer is thin enough, typically a few nanometers, then hot electrons may bypass the dielectric conduction band and hit the following conduction band edge of the subsequent layer (direct tunneling), and while traversing through the electric-field of that conduction band, they gain much higher kinetic energy. Some calculations of de Broglie wavelengths for particles and experiments showed that energetic electrons can tunnel over long distances (10-30 Å) on a time scale as short as 10 fs in biological systems, and chemical systems. An even longer tunneling distance was proposed in biological systems with energy bands analogous to those found in hot-electron devices. In 1941, Albert Szent-Gyorgyi proposed that electrons travel between redox enzymes immobilized in membranes by using energy bands analogous to those found in semiconductors The landscape changed dramatically in 1966 when DeVault and Chance demonstrated that a cytochrome in the photosynthetic bacterium *Chromatium vinosum* was oxidized with a half-time of 2 µs following excitation with a pulsed ruby laser in kinetics that can only be accounted for by electron tunneling over 30-70 Å, depending electron energy and on the actual barrier height.

A commonly used prior art process, since 1960s, is to generate tunneling electrons through insulating metal oxide barriers upon application of voltage to different cathodic structures of various junctions, including metal/insulator/metal (M/I/M), metal/insulator/semiconductor (M/I/S) and semiconductor/metal/semiconductor (S/M/S).

Hot electrons produced through those junctions can be then "jet" directed into vacuum, insulating liquids or aqueous electrolyte solutions. Metal conductor/insulator/electrolyte solution (C/I/E) or (M/I/E) was another junction variation, which was also long been reported, where the electrolyte solution was applied over a thin metal oxide metal film coated on metal cathode. In fact, the ability of a fraction of electrons in the critical density region (from the energy region near the Fermi energy) to tunnel elastically from the metal cathode through the insulator (without loss of energy during the tunneling process if the insulator is thin enough), into different materials, was first demonstrated in August 1960.

Two, or three-layer based heterojunction structures (heterostructures) are used to generate hot electrons, where different material properties, i.e. different band gaps, are grown on each other in multilayers with alternating materials. Depending on the alignment of valence and conduction bands, potential steps occur at the interface. Various parameters, such as the type of conductor (either a metal or a doped semiconductor) used, the composition of the compound semiconductors or insulator involved, the layer thicknesses or the doping concentrations in principle allow the engineering of any desired potential profiles and band structure properties of a heterostructure device. Another variable, that is often overlooked, is the type of hot electrons host material that makes the junction after hot electrons tunnel through the metal oxide layer will affect the lifetime (often denoted by the symbol $\tau$) of hot electrons. For example, in copper and gold, $\tau$ is strongly enhanced, let's say as opposed to aluminium. The large d-band density of states below the Fermi energy $E_F$ is responsible for that strong enhancement of $\tau$ due to efficient electron screening (shielding of the nuclei). The dynamical behavior of a free carrier (hot electron and/or hot hole) under applied fields is determined partly by electronic structure of the host material and partly by the way the carrier deforms or polarizes its host.

With the invention of growth techniques such as molecular beam epitaxy and metal-organic chemical vapor deposition (MOCVD) in the 1970s, it became possible to grow heterostructure layers on an atomic scale.

Practical applications of energetic electrons are mainly limited to those electrons with excess energies slightly above the Fermi level, which can be approximately treated as independent particles. This type of "lower energy" hot electrons (which may perhaps be called "warm" electrons) have a much longer lifetime than that of "true" hot electrons with higher energy, which are too short-lived. So, lower-energy hot electrons have found several applications. Among those, are Non-Volatile (NV) solid state flash memories, where 7-8 nm metal oxide (insulator) thickness is the bare minimum, so that the flash memory chip can retain charge in the floating gates for at least 20 years, while a thickness of 4.5 nm causes a 20% charge loss in 4.4 minutes. Other "lower energy" hot electrons-based application such as scanning tunneling microscopy, photodetection and light-emitting diodes are also worth mentioning.

While lower energy hot electrons are characterized by a longer lifetime, higher energy hot electrons are short-lived with biexponential decay in a femtosecond time scale, due to scattering and charge recombination. Those hot electrons first exist in a non-thermal equilibrium status and then enter into fast thermalization phase under scattering effect and electron-electron processes. Subsequently they equilibrate with the lattice, and in case of a hot electron being the product of light-induced surface plasmon (i.e. incompressible oscillations of electrons in metallic nanostructures), that equilibration happens through electron-phonon (e-p) processes. The generation of those hot electrons, in the prior art, is followed by ultrafast temporal relaxation, decay, excited state trapping and charge recombination, on a femtosecond time-scale and on a nanometer spatial scale. Those processes plagued previous "industrial" pursuits of practical applications based on "high-energy" hot electrons, which lose their energy too rapidly to be utilized or harnessed. This applies to attempts to use high-energy hot electrons as energetic reagents that catalyze chemical reactions and break chemical bonds through non-thermal energy transfer, which is the topic of current invention. For example, the majority of photogenerated hot electrons in junction-based solar cells are thermalized and thus cannot be a direct source of photocurrent, but can be used as a second source of photons (via radiative recombination as opposed to non-radiative decay) and thus contribute to additional photocurrent generation. Likewise, most of the practical applications of high-energy hot electrons are based on quasi-thermal ensembles (as the case with Gunn effect).

Because of their extremely short lifetime in the prior art, "energetic" hot electrons-based applications could not gain ground in the industry. The present invention overcomes that limitation by using spatial enhancement of electric field-based induction of hot electrons and hole-scavenging capacity to make hot electrons.

For every hot electron that tunnels out of the surface, a positive "hot" hole is left behind in the metal where they accumulate with the continuous generation of hot electrons. A certain fraction of the holes recombine with conduction band electrons at the surface (surface recombination, giving rise to the surface recombination loss. While those hot holes are spatially separated from hot electrons by means of a Schottky barrier, they still can gain enough energy to tunnel across that boundary (once the momentum criteria for crossing the metal-insulator Schottky barrier are satisfied) or go over it by emission. Once in the dielectric insulator layer, hot holes will be prone to be trapped, where the main constituent of the hole trap centers is $O^-$. That is, the holes will be trapped on an oxygen bridging between two atoms in a lattice silicon. From then on, holes move by hopping between neighboring oxygen atoms, with a field-independent mobility.

In analogous biological systems, 20-Å hole hopping (multistep tunneling) has been established. This leads to oxygen vacancies having multiple charge states, as many as five in case of high dielectric constant oxides like hafnium dioxide ($HfO_2$). If there are impurities in the metal producing hot electrons, hot holes can be trapped as well in the metal (where holes are localized on a regular anion). Otherwise, hot holes can also be self-trapped upon coupling to ionic vibrations that would affect its apparent mass and could effectively immobilize the hot hole (self-trapping). The end result will be permanent atomic displacement and breakdown of the thin insulating metal oxide layer. Self-trapping causes energy localization that may enable defect processes. Trapping and self-trapping often occur in combination with an energy barrier between the self-trapped and non-self-trapped states with an interplay of such intrinsic self-trapping with trapping and localization associated with defects or disorder. That allows for short circuits and the compromise of generation of high energy hot electrons. Add to that the energy loss upon recombination of hot electron/hot holes recombination.

To avoid hot holes-based energy dissipation, the present invention preferably utilizes non-stoichiometric nickel oxide, $NiO_x$, as a backside p-type-like semiconductor, characterized by a wide band gap, to pull holes out of the metal under an additional electric field effect. Well-established theoretical calculations and experimental work confirmed the characteristic of $NiO_x$ as an insulator that offers high conduction band offset and low valence band offset with Si and by reducing Schottky barrier height, it can be used for selective transfer of holes while blocking electron transport. $IrO_2$ has also been used to enable oxygen radicals to scavenge trapped holes. However, those selective captures of holes could only scavenge a fraction of trapped holes. This is likely to be partially due to the $IrO_2$ (and likely $NiO_x$) moving towards charge equilibrium and the inaccessibility of holes caught in deep traps.

According to a preferable embodiment of the present invention, $NiO_x$ is used under an enhanced electric field (as opposed to passive application of $NiO_x$ in prior art) to effectively shuttle the formed holes out of the system to the cathode and thus confers a higher level of efficiency for the whole operation to generate hot electrons for the purpose of non-thermal disruption of C—H bond in methane as a mandatory step in the path of partial oxidation of methane to methanol. In the presence of water molecules in the reaction medium, hot electrons, if they hit the conduction band of water, may convert to hydrated electrons. Those are the same type of species also produced in aqueous radiolysis and photolysis. Hydrated electrons (designated by the symbol $e^-_{aq}$) have a longer half-life (on a nanosecond scale than that of hot electrons, which is on a picosecond scale with shorter lifetime for more energetic hot electrons. Hydrated electrons are considered as the smallest possible anion-like chemical entity; they are highly reactive reducing species, even towards water itself and dissolved oxygen to form the ion radical superoxide ($O_2^-$), hydroxyl radicals (.OH) and hydrogen peroxide ($H_2O_2$). Hydrogen peroxide is a known oxidant of methane to methanol. Also, hydroxyl radical is the only oxy radical with a sufficiently large bond-formation energy to break the C—H bond of methane and thereby accomplish the net chemistry of the methane monooxygenases:

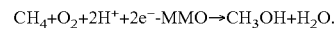

$$CH_4+O_2+2H^++2e^--MMO \to CH_3OH+H_2O.$$

It is worth noting that hydrated electrons may share the same entity as solvated electrons but they differ in energy level and dynamics. Solvated electrons' based observation dates back to Humphry Davy, who described in his laboratory book from 1808 "beautiful metallic appearance" and "fine blue color" observed when potassium crystals are heated in the presence of ammonia vapor. A century later, C. Kraus in 1908 attributed that observation to the dissociation equilibrium $Na \leftrightarrow Na^++e^-$, when an alkali metal is dissolved in liquid ammonia ($M+\alpha NH_3 \leftrightarrow [M(NH_3)_{\alpha-x}+e^-(NH_3)_x]$). It takes a much higher number of ammonia molecules (ca. 32-40) to slowly solvate a given electron while a hot electron can be fast hydrated by only three water molecules.

While the current invention demonstrates the effectiveness of hot electrons-based approach to oxidize methane, any successful selective oxidation of methane, where methanol is the end product, must provide means to prevent further oxidation of methanol. Steric control of the oxidation of methane and making the transition complex between methanol and the catalytic transition metal unstable were inferred to be the likely means used by nature as well as in the current invention to make the oxidation of methane selective towards methanol.

Figure 5:
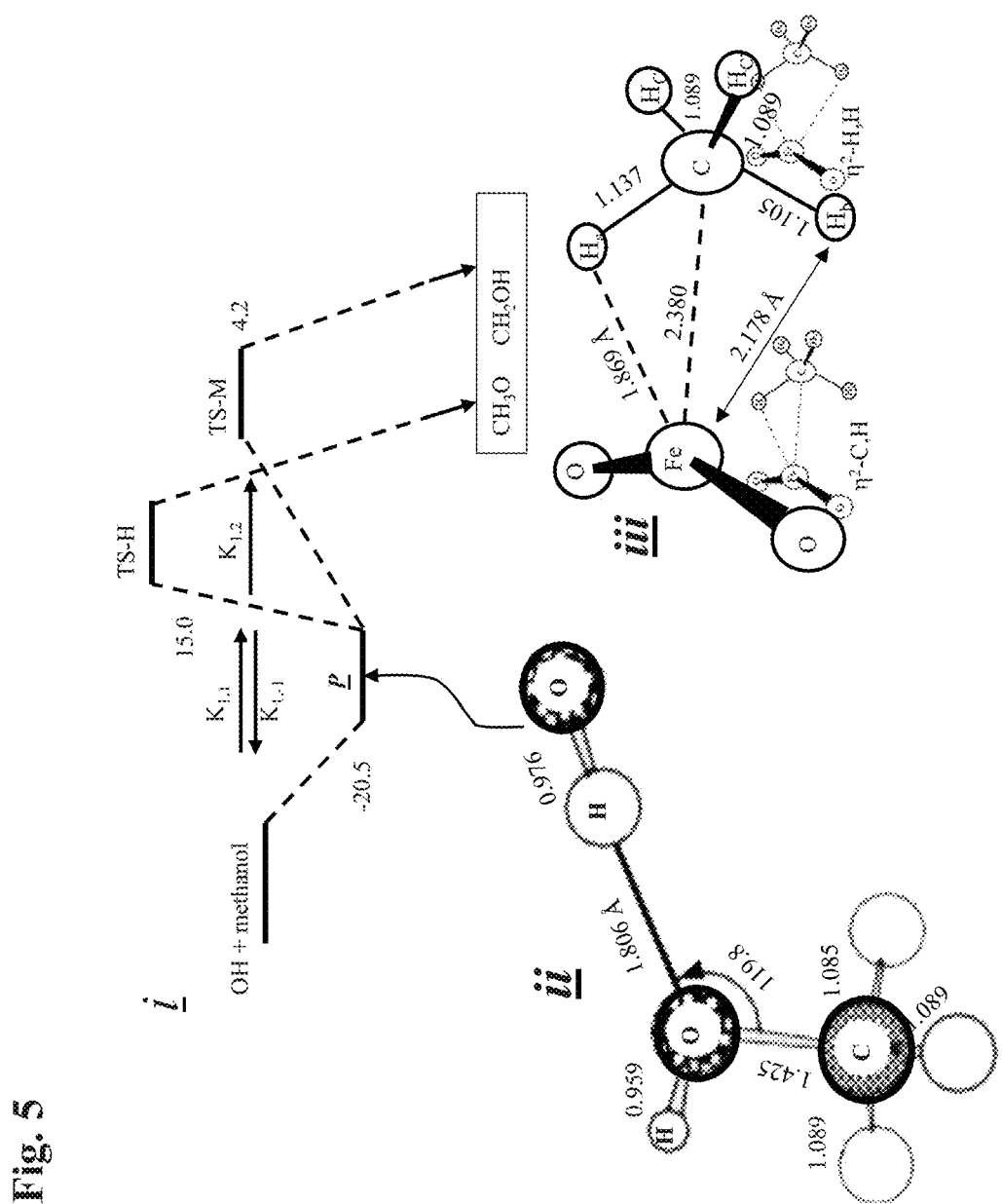
FIG. 5 illustrates the steric control of oxidation selectivity of methane to methanol in the present invention, in light of how spatially demanding is the OH radical-based abstracting of one H atom from methanol as opposed to the same process on methane inside a spatially restricted zeolite's active pockets.

FIGS. 5 i-iii shows the principle of the steric control of oxidation selectivity of methane to methanol in the present invention in light of how spatially demanding is the OH radical-based abstracting of one H atom from methanol as opposed to the same process on methane inside spatially restricted zeolite's active pockets.

In FIG. 5i depicts the schematic potential energy surface for the reaction between OH radical and methanol, with all energies given in kJ $mol^{-1}$ relative to the reagents. Prefers to the pre-reaction hydrogen bonded complex formed between OH radical and methanol molecule. TS-H and TS-M represent transition states located at the barriers to transition states formed by the roaming OH radical abstracting either the H atom of the hydroxyl group (TS-H) or one of the H atoms of the methyl group (TS-M), respectively. The macroscopic rate coefficients $k_{1,1}$ and $k_{1,-1}$ correspond to the formation and re-dissociation of the pre-reaction complex and $k_{1,2}$ corresponds to hydrogen abstraction via either of the two transition states. The pre-reaction hydrogen bonded complex is characterized by a weak (−20.5 kJ mol$^{-1}$) hydrogen-bonded complex. Around room temperature and above, this weakly bound complex has too short lifetime to allow for significant tunneling-based abstraction of a hydrogen atom in methanol. Thus, this mechanism for the oxidation of methanol is more pronounced at a very low temperature, as is the case with low temperature conditions of interstellar molecular clouds.

FIG. 5 ii is a schematic representation of the very loose OH . . . OHCH$_3$ bond where the hydrogen bond between the OH and OHCH$_3$ is separated by 1.806 Å distance, in the pre-reaction hydrogen bonded complex for the oxidation of methanol. Distances between atoms are shown in Angstroms.

FIG. 5 iii is a schematic representation of CH$_4$, coordinated with the transition metal center to show bond sizes in comparison of that in methanol. There is a minimum of two coordination lines between methane and the transition metal catalyzing methane oxidation. Shown is a geometry-optimized coordination mode of CH$_4$ with the transition metal center, with two possible coordination modes for methane binding to the transition metal (M) center, with either two coordination hydrogen atoms $\eta^2$-H,H or a hydrogen and a carbon atom $\eta^2$-C,H.

In the pre-reaction complex OH.OHCH$_3$, OH moves around and extracts one of the H atoms of the methyl group, or the H atom of the hydroxyl group reaction. This leads to the assumption that hydroxyl radical based oxidation of methanol to formaldehyde is more spatially demanding than that of methane to methanol. This conclusion is supported by the experimental data that when the oxidation of methanol is performed on a zeolite, that zeolite should have a medium to large pore size and be treated to change its geometric parameters and to modify its acidic and/or redox catalytic properties. Therefore, zeolite pore size or the size of catalytic cages becomes a tool to enhance the selectivity of the reaction in favor of methanol as the main or only product in the liquid phase.

There is no thermodynamic or chemical oxidative pathway where the oxidation of methane, starting with the scission of the very stable C—H bond, stops with the formation of methanol. A catalyst that can be used for the hydroxylation of the very strong C—H bond of methane should also oxidize the methanol product, possibly until the end products of H$_2$O and CO$_2$. In principle, methanol is more easily oxidized (to formaldehyde) than methane is to methanol. If the HOMO of the new compound (i.e. methanol) is higher in energy than the HOMO of the C—H bond (in methane), then the new compound will be more reactive as a nucleophile (i.e. more susceptible to electrophilic attach) and easier to oxidize further. This is indeed the case here. In methanol, that orbital is antibonding with the lone pair (non-bonding pair) on oxygen. That makes the donor orbital in methanol closer (than that in methane) to the dpσ* acceptor orbital, which is the lowest-lying α-spin (i.e. (ms=+ ½) unoccupied orbital, formed the hybridization of the d-orbital of an Fe and the p-orbital of an O atom in FeO$^{2+}$. The closer is the energy gap between the donor orbital and acceptor, the more feasible is the donor-acceptor interaction. That makes methanol more readily oxidized than methane by FeO$^{2+}$. However, when methanol is formed, at the end of reaction path, the iron at that point is not at its high-spin state but rather at its low spin, unstable Fe(I) oxidation state, and the methanol-Fe complex will be in the form [Fe(CH$_3$OH)]$^+$. This momentary condition does not favor further oxidation of methanol, before being desorbed from the metal. In the case of MMO, based on previous computational work, an inhibiting factor was proposed in the form of steric hindrance on methanol, which is bulkier and more polar than methane, to make the reaction selective for methane oxidation. The current invention utilizes well-known zeolite structures that provide a steric hindrance for methanol, analogous to the one that exists in MMO.

Zeolites are mainly known as micro and nanoporous aluminosilicates with various Si-to-Al ratios. Those zeolites are structurally made of tetrahedra linked together at the corners to form a 3-D network. The tetrahedra consist of a "T" atom at the center, such as Si or Al, bonded to four oxygen atoms at the corners. The tetrahedra are organized in such a way as to provide a plethora of currently known framework types, each with a unique topology and three-letter code assigned by the International Zeolite Association (IZA). The zeolite channel and pore sizes are determined by the ring size, which is the number of T atoms bonded together (with oxygen atoms in between T atoms) to form a ring. These pore openings consist of 6-, 8-, 9-, 10-, 12-, 14-, 18-, and 20-membered rings.

Several non-aluminosilicate-types also exist, such as aluminophosphate zeolites and germanate zeolite (e.g. SBN, material UCSB-9, invented by the University of California, Santa Barbara, with the formula |(CH$_3$NH$_3$)$_8$| [Ga$_8$Ge$_{12}$O$_{40}$]—Santa Barbra Nine. SBN has been shown to have excellent capacity to selectively capture methane. Examples of zeolite structures with one-dimensional channels and a diameter that is optimal for methane molecules are zeolite ZON (ZAPO-M1—Formula: |(C$_4$H$_{12}$N$^+$)$_8$| [Zn$_8$Al$_{24}$P$_{32}$ O$_{128}$]—ZON C$_4$H$_{12}$N$^+$=tetramethylammonium, invented in 1995) and FER (Ferrierite—Formula: |Mg$^{2+}$$_2$Na$^+$$_2$ (H2O)$_{18}$|[Al$_6$Si$_{30}$ O$_{72}$]-FER, invented in 1978). For the purpose of selective oxidation of methane, zeolites are often doped with transition metals (Ce, Cu or Fe (Ce, Cu or Fe metal-exchanged zeolites (also called "metal-doped zeolites")), which have proved promising. Since Si has a charge of 4+ and Al has a charge of 3+, the isomorphous substitution of Al for Si results in a negatively charged framework, which is compensated by cations. This is the origin of the zeolites' ion exchange capacity.

Zeolite frameworks display a geometric property termed as a 'flexibility window' which changes its size upon interacting with guest molecules. Within zeolite frameworks, the oxygen atoms are treated as force-free spherical joints, which are presumed to act as freely-rotating, force-free, spherical joints, about which polyhedral building blocks can rotate. The system of joints and bars forms periodic trusses. Outside the flexibility window, distortions of the framework can be geometrical. This steric effect is minimized in zeolites when dynamic flexibility is enhanced, e.g. by the incorporation of germanium. In such cases, molecules with kinetic diameter larger than the pore entrance of the zeolites can be adsorbed and diffused through that "flexible" zeolite.

Zeolite framework structures may contain linked cavities, channel and cages with confinement effect, where nano small cages act like nanoreactors. Fe or Cu doped zeolites have shown some analogous features with the active center of MMO, including the tri or di-metal center bridged by an oxygen atom. The analogy between those zeolites and MMO extends to include steric hindrance to inhibit the bulkier methanol molecule from getting close enough to the oxo oxygen core to benefit from the favorable electronic state that is critical for the oxidation. For example, the truncated octahedron known as the β-cage of the Faujasite aluminosilicate frameworks can be designed to restrict methanol from coming into close contact with the catalytic center. The extrinsic flexibility window can be limited not only in compression, but also in expansion, as the beta-cages in a maximally expanded framework lack the flexibility to adapt bulky contents such as a methanol, especially in the presence of less bulky molecules such as water molecules. In our case methane molecules are less bulky molecules that would successfully compete against methanol for occupying those cages. Once methanol is formed, it would not be easily accommodated inside those cages and desorb out of the methanol-Fe unstable complex, where Fe is in the form of an unstable Fe(I) oxidation state. Also, methanol faces steric constraints to pass through the 8-ring windows in small pore zeolites and zeotypes, i.e. zeolite-like materials with a similar crystalline structure, fine-tuned properties but different chemical composition. In the Sodalite (SOD) zeolite framework, steric hindrance prevents methanol from lying in the six-ring windows, and thus the molecule is situated (as physisorbed instead of chemisorbed) in the more open cage region of the structure. Copper-exchanged Mordenite (MOR) has non-intersecting 12-membered ring (12-MR) channels with 8-membered ring (8-MR) pockets, and was used for selective conversion of methane to methanol. Despite its large pores, it was postulated that MOR has similar steric constraints as found for the hydrophobic cavity formed by the pmoA and pmoC subunits of pMMO. That steric effect is perhaps more enhanced in small-pore zeolites such as AEI, CHA, AFX than in medium-pore zeolites such as ZSM-5 (MFI) or large-pore zeolites such as MOR.

In addition to the steric effect, there is also the confinement effect of zeolites. The basic idea of this effect is that the orbitals of the molecule inside the zeolite cage are not extended over all the space, as they are in the gas phase. For example. ZSM-5 zeolite with a medium 10-membered-ring size is known to possess distinct steric effects and sieving properties for molecules having a kinetic diameter >6.9 Å. Since the kinetic diameter of methane is ~3.7 Å, it should be easily adsorbed and diffused through that zeolite. However, when it reaches the site of the metal species located on the wall of the ring, methane starts to suffer from the confinement of space due to the nanopore nature of the zeolite. This forces the bond between the methane and the active catalytic metal to take a bent structure, which weakens the adsorption energy of methane and increases its likelihood of being activated. That is the smaller the ∠O-Metal-Carbon angle, the weaker the binding energy. This confinement effect is supposed to be more pronounced in methanol, whose kinetic diameter is >3.7 Å and dipole moment (D) is 1.70, as opposed to methane, which is non-polar. Nevertheless, in reported prior art, while the newly formed methanol is being spatially under zeolite confinement effect and may be sterically hindered against further oxidation, somehow it stays adsorbed on the wall of channels and is not spontaneously liberated. Thus, methanol desorption becomes the rate-determining step of the reaction, as evident in an experiment showing that methane was reacted at 60° C., but then the temperature was raised to 200° C. to obtain methanol, with water treatment. So, the most effective strategy to prevent methanol from further oxidation is to remove it from the system as soon as it is formed. The present invention utilizes hot electrons, which possess the capacity to non-thermally stimulate desorption of adsorbed "polar" molecules on the surface of metals. This occurs by means of hot electrons hopping into and interacting with the π orbital (which is absent in methane but exists in methanol) of the adsorbed molecule. Electron-electron coulomb repulsion and vibrational transfer of energy are large enough to exceed the desorption energy. They may also cause excitation of internal vibrational and/or rotational modes of the desorbed molecule.

If catalytic-site-based further oxidation of methanol is prevented via the collective effect of zeolite structurally-imposed steric hindrance, confinement effect of catalytic sites and hot-electron-induced non-thermal desorption of methanol from the zeolite surface, one might expect over-oxidation to be mediated by hydroxyl radicals generated by hot electrons. However, OH radical-based abstracting of one H atom from methanol is too spatially demanding (FIG. 5) to take place in zeolites' restricted cages.

OH-based oxidation of methanol starts with the formation of a hydrogen bonded complex between the hydroxyl radical and methanol to form OH . . . OHCH$_3$ (a.k.a. pre-reaction complex). This complex must be long-lived enough against re-dissociation to increase the probability of tunneling to extract a hydrogen atom from methane. However, around room temperature and above, as in the case of the present invention, this weakly bound complex has too short a lifetime to allow for significant tunneling-based abstraction of a hydrogen atom in methanol. This explains why this mechanism for the oxidation of methanol is more pronounced at very low temperature, as characteristic of the temperature conditions of interstellar molecular clouds, where products of oxidation of methanol are detected.

If the OH . . . OHCH$_3$ lives long enough, then the hydroxyl radical roams around to extract a hydrogen atom from either the hydroxyl group or the methyl group of methanol, to form CH$_3$O+H$_2$O, or CH$_2$OH+H$_2$O, respectively, and proceed to form formaldehyde (CH$_3$O→CH$_2$O+ H; or CH$_2$OH+OH→CH$_2$O+H$_2$O).

The structure of the pre-reaction complex (OH . . . OHCH$_3$) is very loose (FIG. 5) with one hydrogen bond where the OH and OHCH$_3$ separation is 1.806 Å. Moreover, spatial arrangement of electron clouds at the relevant bonds as well as rotational requirements lead to the assumption that hydroxyl radical based oxidation of methanol to formaldehyde is more spatially demanding than that of methane to methanol. This conclusion is supported by the experimental data that when the oxidation of methanol is performed on a zeolite, that zeolite should have a medium to large pore size and be treated to change its geometric parameters and to modify its acidic and/or redox catalytic properties. Therefore, zeolite pore size or the size of catalytic cages becomes a tool to enhance the selectivity of the reaction in favor of methanol as the main and in some cases only product.

The structures of zeolites allow for wiggle room to enhance selectivity of methane to methanol oxidation. The orderly framework (F) of the zeolite is called a crystal lattice; on its external surface or within its channels, cavities, or cages there are Extra-Framework (EF) sites, which are formed during synthesis or post-synthesis treatment, and host exchangeable "cationic" species that balance the negative charge of the framework. EF sites contribute to stabilizing the framework, and also contain additional catalytically active sites. EF sites can also narrow the size of the zeolite channels or of their mouths, thus improving the selectivity effect.

The present invention provides a nano/micro environment where metal-based spin-crossover (SCO) is likely to take place via energy transfer under the direct impact of hot electrons generated in pulses. This should provide a means to shuttle the metal between low and high oxidation and spin states during and in between hot electron pulses, which mirrors (but does not mimic) the shuttling scenario between different oxidation and spin states of the iron in the active center of sMMO. This conclusion is based on the fact that metal compounds undergo a change in electronic configuration and spin-crossover (SCO) in response to an external input such as heat, light, pressure, irradiation, temperature or changes in magnetic field. The present invention thus provides a novel hot electron-based quasi chemical looping, where a cyclic redox scheme and shuttling of the catalytic metal between different spin and valence states take place. This is achieved through a hot electron mediated reductive pathway, while the oxidative pathway is mediated by hydrogen peroxide, hydroxyl radical and/or superoxide anions, produced upon the interaction between energy-tunable hot electrons and water.

In an alternative embodiment, the insulator layer is skipped so that the heterostructure becomes MP/MZ instead of MP/MIZ. Nevertheless, an emission current, in the range of 8 $\mu A/cm^2$ was still being measured at a bias voltage of >5.2 V, which presumably reflects the work function of the zeolite composite surface. That means that there was still hot electron generation at the absence of the insulator layer. While that was highly unexpected, it may be partially explained in the dim light offered by some scattered literature related to coordination chemistry and electronic structures. When a transition metal complex enters the zeolite cavity, it forms a double layer in the zeolite cavities with an electric field existing between the double layer. That electric field alters the energy levels and chemical behavior of the transition-metal complexes, where the molecular orbital of the metal complex cannot extend over the entire space but instead is restricted within the dimension of the zeolite cages. The electric field acting inside the zeolite matrix causes the position of HOMO and LUMO levels of the metal complexes to change in various zeolites, while the framework of the zeolite is inherently acting as an insulator. Aluminosilicate zeolites are considered as insulators with a wide band gap of about 7 eV, which is slightly lower than that of $SiO_2$ (i.e. 8.9 eV). In the aluminosilicate framework of zeolite, Si has a charge of 4+ and Al has a charge of 3+. So, the isomorphous substitution of Al for Si results in a negatively charged framework, which would repel electrons, depending on the charge compensation made by doped cations. That should lead to the formation of a Schottky barrier analogue at the junction, which would trigger the generation of "energetic" hot electrons that succeed to build up energy above the barrier and thus tunnel their way through it. That zeolite-lattice based effect combined with the heterogeneous electric field induced by the internal anisotropic structure of the zeolite would explain the generation of hot electrons in the MP/MZ heterostructure presented in this embodiment of the present invention.

The omission of the metal oxide layer (i.e. insulation layer) is expected to have progressive positive impact on the techno-economic potential of the invention, related to mass production. So, instead of using wafers similar to those used in the computer industry, layers of zeolites or cheaper suitable carbonaceous supporting porous materials deposited on conducting metals such as steel or cheaper materials (e.g. aluminium) can be used. For example, this is done via Ribbon Growth on Substrate (RGS) processes, already available for solar cells manufacturing, where different technologies (e.g. Edge-Defined film fed growth (EFG) the string ribbon (SR) and the dendritic web technology) are used to stabilize the edges. So, the high costs associated with wafer manufacturing can be avoided by replacing the wafer-cutting steps with a continuous production of a thin foil or sheet directly from a metal melt.

It is well documented in the public domain literature that the presence of sharp tips/protrusions on the surface causes a geometrical enhancement factor (denoted by β) of field emission. Field emission is the ejection of electrons from the metal surface through quantum mechanical tunneling under the effect of an electric field, governed by the Fowler-Nordheim model. The larger the β, the higher is the field concentration, and therefore, lower is the effective threshold voltage for emission. Thus, anisotropic surface (surface roughness) with sharp protrusions should have the ability to create electromagnetic field enhancements around their surface protrusions (with respect to the bottom surface). This leads to an increased population of hot electrons at those tips/protrusions.

Tuning the surface roughness and structure geometry to create a heterogeneous electric field (as opposed to the uniform electric field when a planar insulator layer with uniform thickness is used) to enhance the generation of hot electrons is known. Moreover, there are shortcomings in hot electron devices that rely on a heterogeneous electric field-that induces localized field strength at sharp tips on the surface of the material that emits hot electrons. The shapes and geometric configurations of those tips are prone to deformations, the slightest of which will have substantial effects on the density of hot electrons emission. Even if those deformations are not the result of manufacturing imperfections, they inevitably appear during the course of operation, where charged contaminants are attracted to and collide with those tips, causing damage, which alters the topology of those tips. This certainly compromises the efficiency and lifetime of those devices.

An advantage in the present invention is that the heterogeneous electric field that induces the generation of hot electrons is created within the zeolite structure (more so than on the surface) due to the heterogeneity of zeolite internal channels. That is, energetic electrons are co-located with the catalytic centers in zeolites' cages. That mirrors the "entatic" site in MMO, characterized by "strained" state of unusual energy where the methane molecule is activated.

Geometrically enhanced electrodes, by protrusions (symbolized by nanocones) on the surface, generates heterogeneous electric field, with higher field concentrations on edges, creating difference in Fermi energies between the metal bottom surface and the tips of the nanocones. This creates a Schottky-like barrier, which is inherently sensitive to the difference in Fermi energies between the metal bottom surface and tips of nanocones. Therefore, hot electrons can be generated at an intensity that is inversely proportional to the taper radius of the nanocone and after reaching a taper radius threshold that depends on the type of metal used.

In the present invention, the heterogeneous electric field is induced by using supporting material (e.g. zeolites) with an internal heterogeneous structure. Those internal heterogeneous structures are closer to the electrode than the distant surface protrusions and thus have spatial advantage to influence the electric field. Due to the physical, chemical and geometric characteristics of the metal-doped zeolites used, peculiar internal structural confinement leads to unusual behavior of electrons and holes with profound consequences in terms of converting methane to methanol.

In is well known for insulator thin layer-based tunnel electron emitters that the insulator layer "I" must be thin (a few nanometer) and uniform, which creates a manufacturing challenge. Moreover, during operation, degradation of that insulator layer (breakage of the Si—O—Si bond) becomes inevitable due to electric stress, electron scattering, hole trapping and physical stress due to the volume expansion of (from Si to $SiO_2$, in case of Si/SiO2 interface). Those drawbacks are addressed in the present invention, where that metal oxide insulator layer acts as an auxiliary but not the primary element that induces the spatial buildup of charge in one region until the threshold for tunneling conduction is reached, upon applying an external electric field. Therefore, it was possible to skip the metal oxide layer from the heterostructure described in the main embodiment without impairing the functionality of the invention, and that removes a bottleneck in the future manufacturing process of the present invention.

Figure 6:
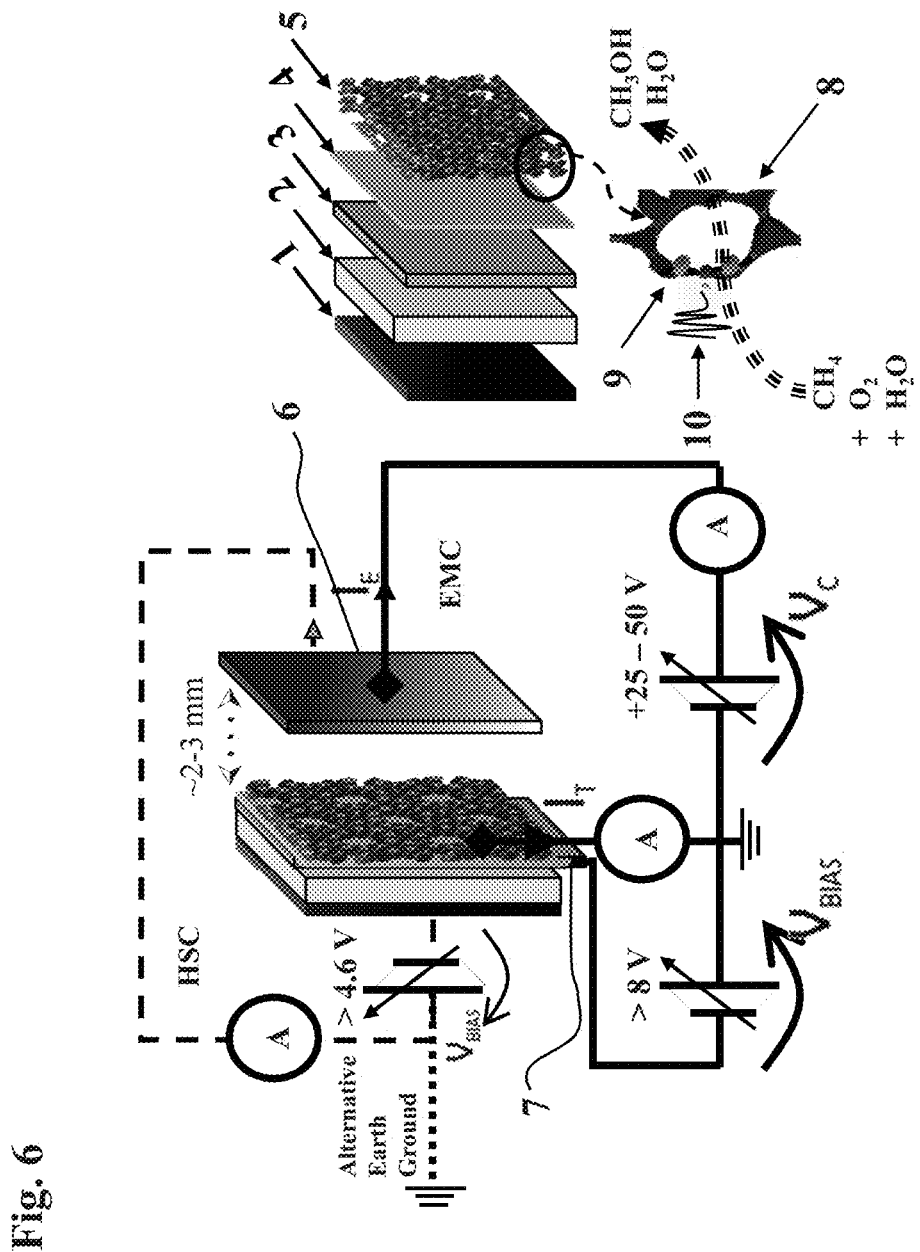
FIG. 6 shows a general embodiment of the present invention.

A general embodiment of the present invention is shown in FIG. 6. It portrays a structure and process to selectively convert methane to methanol under ambient conditions and in a scalable manner via electronic simulation of the same process done in nature by the enzyme methane monooxygenase, as well as in the astrophysically observed process of the same conversion. The figure is a schematic depiction of components, connections and circuits; parameters of thicknesses of layers, voltages and dimensions are shown. The layered cathode structure is shown on the right hand side of FIG. 6 in an exploded view, with the layers indicated by the numerals below:

1 is a layer of a conducting metal, preferably Al, 2 is a layer for the hole-shuttling purpose, advantageously P—$NiO_x$ (advantageously of a thickness ~40 nm) or alternative P-type-like semiconductor or wide-band gap materials, 3 is a layer of elemental (metal) Si (advantageous thickness ~>20 nm), 4 is an insulator layer, e.g. $SiO_2$ (advantageous thickness ~4 nm) or any true insulator (i.e. Fermi level in the mid-gap region). It may be a high-κ "high-kappa" dielectric metal oxide, whereby a thicker layer can be used, 5 is a layer of porous support material, advantageously a zeolite doped with a transition element such as copper, cerium or iron-exchanged zeolite, preferable thickness >500 nm (e.g. ZSM-5, MOR, FAU, etc.). Alternative, carbonaceous materials such as nanotubes, graphene and cylindrical fullerenes can also be used with planar or tubular/cylindrical geometry, 6 is an anode plate, preferably formed of copper or copper alloy material, or composite material with good conductivity, advantageously situated about 2-3 mm from the porous support material, 7 represents an extension of the metal layer beyond the active area to allow for making mechanical electric connections, 8 indicates a blown-up detail of an active site (catalytic pocket) in the porous support, showing a confined μ-oxygen bridged metal atom 9 and an incoming hot electron 10, as well as incoming starting materials and leaving products.

Further in FIG. 6, EMC denotes the electron emission circuit; HSC denotes the hole shuttling circuit, which in an alternative embodiment may be configured as a connection to ground; A denotes ammeters; $V_c$ is the collector (anode) voltage; $V_{BIAS}$ is the bias voltage; $I_T$ is the transmission current; and $I_E$ is the emission current that reaches the anode.

A general embodiment of the present invention thus utilizes an electric device where the anode is a metal plate and components of the cathodic heterostructure are arranged in layer-by-layer deposited in the following order from the back to front of the hot electron emitting end of the device: Metal-(P-type-like) Semiconductor/Metal-Insulator-Zeolite (MP/MIZ). The MIZ component (Electron Emission Circuit (EMC)) is meant to generate hot electrons, while the MP component (Hole Shuttling Circuit (HSC)) is meant to shuttle the "hot holes", which are left in the metal interface upon emission of hot electron, out of the device. The metal layer advantageously extends beyond the active area to allow for making mechanical electric connections. The metal plate that works as the anode is typically a few millimeters larger than the active area of energetic electron emissions and completely covers it to minimize the number of emitted electrons that escape the anode (a.k.a. collector). The EMC and HSC can share a common anode electrode but must be biased with respect to each other or the HSC, instead of being a closed-loop circuit, it can be earth-grounded.

In a preferred embodiment, the present invention provides hot electron-based reductive activation of catalytic pockets of μ-oxygen-bridged metal atoms in copper or iron-exchanged zeolites. The metal exchanged zeolites can be any of the zeolites available in the public domain, e.g. small-pore zeolites such as AEI, CHA, AFX; medium-pore zeolites such as ZSM-5 (MFI) and large-pore zeolites such as MOR.

In alternative embodiments of the invention, μ-oxygen-bridged metal atoms can be anchored (dispersed or embedded) into different carbonaceous materials such as nanotubes, graphene and cylindrical fullerenes. While a planar geometry is useful, tubular geometries can also be used in different embodiments of the invention to maximize the surface area of interaction. If methane is to first get converted to methoxy intermediates species or a methyl-metal complex, anchored into the metal, prior to the second step of methanol formation, then the energetic stability of those grafted "anchored" species differ based on the materials used to support μ-oxygen-bridged metal atoms. The less energetically stable is the anchored intermediate, the higher is the rate of formation of methanol. Thus, many alterations and modifications may be made to the current invention by those having ordinary skill in the art without departing from the spirit and scope of the invention. Therefore, it must be understood that the illustrated embodiment has been set forth only for the purposes of example and that it should not be taken as limiting the invention as defined by the claims.

The electrical instrumentation is connected to the system at four points: the back of the hot electron emitting end of the device; the front of device; the metal interface in the cathodic heterostructure of the hot electron emitting device; and the anode electrode.

In case the backside layer is Al, the naturally formed aluminium oxide on the backside of the device is advantageously stripped away with 5% hydrofluoric acid (HF). In order to ensure good electrical contact to the metal substrate, a titanium aluminide wetting layer for aluminium contacts is advantageously sputter deposited according to e.g. patent EP 0 788 145. Alternatively, a wetting layer of a titanium (Ti), or chromium (Cr), with a typical thickness of 10 nm followed by a gold (Au) layer (100 nm thick) may be deposited by Physical Vapor Deposition (PVD). A titanium aluminide wetting layer is preferably applied for aluminium contacts.

The fabrication of the thin metal oxide in the heterostructure may start with a thick oxide (0.75 μm), 1.4×1.6 $cm^2$, grown by wet thermal oxidation at 1000° C. to serve as a stable underlayer for making electrical contact to the devices. Then that thick oxide layer may be etched back in buffered hydrofluoric acid (bHF) in order to open 1×1 $cm^2$ active areas (for a total of 20 devices of 1×1 $cm^2$ active area each in a 100 mm-diameter wafer or 611 devices in a 450 mm-diameter wafer). Masking may be done by standard photolithography. The thin metal oxide may be grown in dry oxygen at 800° C., and annealed at the same temperature for 20 min. in nitrogen. This yields a high quality oxide with a thickness of ~4-6 nm. The other layers in the heterostructure may be deposited by physical vapor depositions. The p-type-like semiconductor film (i.e. p-NiO$_x$ in one of the embodiments of the present invention) with thickness of about 40 nm is prepared by spin-coating at 4000 rpm for 15 seconds. This is followed by drying the sample on a hotplate at 275° C. for 15 minutes with subsequent sintering at 400° C. in air at one atmosphere in a tube furnace (e.g. Mellen SC12.5R). An oxygen plasma treatment is performed for about 5 minutes (200 W oxygen plasma cleaner) to clean and ensure decomposition of organics in the p-NiOx). Thin zeolite film is formed by an in situ deposition process to give a thickness around 500 nm. In alternative embodiments of the present invention, the zeolite film may be formed by a spin-on process and hydrophobic coating, which gives a thicker zeolite film (7-10 microns).

The thicknesses of layers may vary. However, the thickness of the insulator, which is a metal oxide material in a preferred embodiment of the present invention, needs to be thin, not more than 7 nm. If silicon oxide is used, ~4 nm thickness achieved the best performance with respect to the production of hot electrons. That low thickness imposed a serious challenge to the present invention, while on the one hand it is desirable to maximize the surface are of the device; and on the other hand, producing a high quality, defect free, thin silicon oxide over a large area is perhaps insurmountable. Therefore, a surface area of 1 cm$^2$ may be used for the hot electron emitting device. This is still a large area when compared to comparable typical devices in the semiconductor industry, where active areas are typically a few square millimeters. Total active area in a single assembly may be about 20 cm$^2$, from 20 such devices clustered in a 100 mm-diameter wafer, or 611 cm$^2$ accumulated active areas from 450 mm-diameter wafer (similar to thin Solar Silicon Wafers). In one variation of the present invention, the silicon oxide layer can be replaced with a "high-kappa" "high-κ" dielectric material such as TiO$_2$, barium oxide (BaO) and ceramic insulator which makes it possible to have a thicker insulator and thus a larger active area can be manufactured. This is governed by the relation:

$$C = \frac{k\varepsilon_0 A}{t}$$

where C is the capacitance, A is the capacitor area, κ is the relative dielectric constant of the material (3.9 for silicon dioxide), ε0 is the permittivity of free space, and t is the thickness of the oxide insulator. Using a "high-κ" dielectric material would give a room to increase the thickness without decreasing C.

In comparison, the surface area of 30 cm$^2$ was given for an electrochemical cell described in US 2014/0124381 A1, where methane is oxidized to methanol at the anode of an electrochemical cell with Metal Oxy-Hydroxide (MOOH) as a catalyst. That catalyst is formed by combining metal oxide cations with hydroxyl anions that pass from the cathode to the anode through electrolyte membrane. In the referenced prior art, as well as the present invention, a scale up of the active area can be made by using stacks of multiple devices.

A bias power supply produces a bias voltage (V$_{BIAS}$) across the device. The value of V$_{BIAS}$ must be larger than the work function of the metal surface from which electrons are to be emitted. For example, the work functions for silicon and platinum are 4.85 eV and 5.65, respectively. Therefore, V$_{BIAS}$ will be higher for platinum than that for silicon. V$_{BIAS}$ from 6-10 V showed good efficiency of emission of electrons in our device. The main embodiment of the invention includes one bias voltage and in a different embodiment two bias voltages are used for the hot electron emitting component and the hole-shuttling component of the device, with two bias paths to generate. A different voltage supply applies a positive collector voltage (V$_C$), which may be up to 70 V; advantageously in the range (20-40 V), with voltage proportionally applied to the distance between the anode and the cathodic structure. At each voltage step after a certain time delay, ammeters measure the transmission and the emission currents: respectively I$_T$ and I$_E$. The current through the insulator that is emitted to vacuum, i.e. the "gaseous" space outside the solid material" is labelled the emission current (I$_E$), and the current through the insulator into the device circuit but not being emitted is labelled the transmission current (I$_T$). Total current is I=I$_T$+I$_E$. However, this is only true if the efficiency of hot electron emission is very high and if measurement is taken under ultra-high vacuum to avoid the scattering of hot electrons by gas molecules, and thus emitted electrons reach the collector (anode) successfully. Otherwise, the total current will be almost equal to the transmission current. The purpose of the collector plate is to generate an electric field to enhance the build-up and generation of hot electrons.

The structure is made so that the zeolite surface is under large forward bias. Thus emitted electrons are tunneled across the insulator (i.e. metal oxide)-zeolite interface and attracted to the anode electrode (Cu collector) which is biased positively with respect to the zeolite surface. In another circuit, holes are attracted to the p-type-like semiconductor (or a wide band gap material), which is biased negatively with respect to the metal layer in the hot-electron emitting heterostructure.

The possibility of further oxidation of methanol to other products was not observed in the present invention. Therefore, the process described in the present invention matches the selectivity of MMO in nature. It was tempted to attribute that fortunate and unexpected outcome to an inherent steric control of oxidation selectivity of methane to methanol imposed by structural and electronic characteristics of the metal-doped carbonaceous material used in the present invention with respect to the molecular and electronic configuration of methane and methanol.

Figure 7:
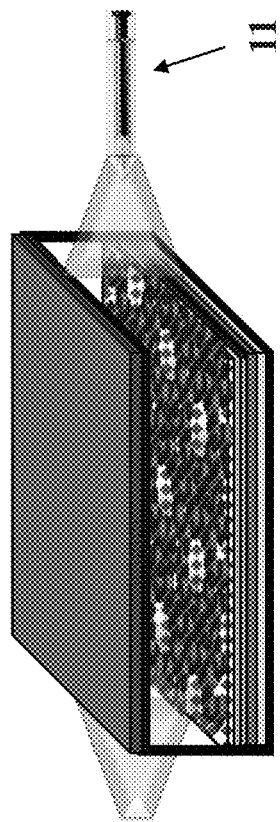
FIG. 7 is a schematic representation of a methane to methanol conversion device unit according to the present invention.

FIG. 7 is a schematic representation of one of the embodiments of the present invention. The schematic drawing shows a batch-like flow reactor having the planar electrode configuration of FIG. 6. The reaction starts and ends with on-off switching of the electric field.

Figure 8:
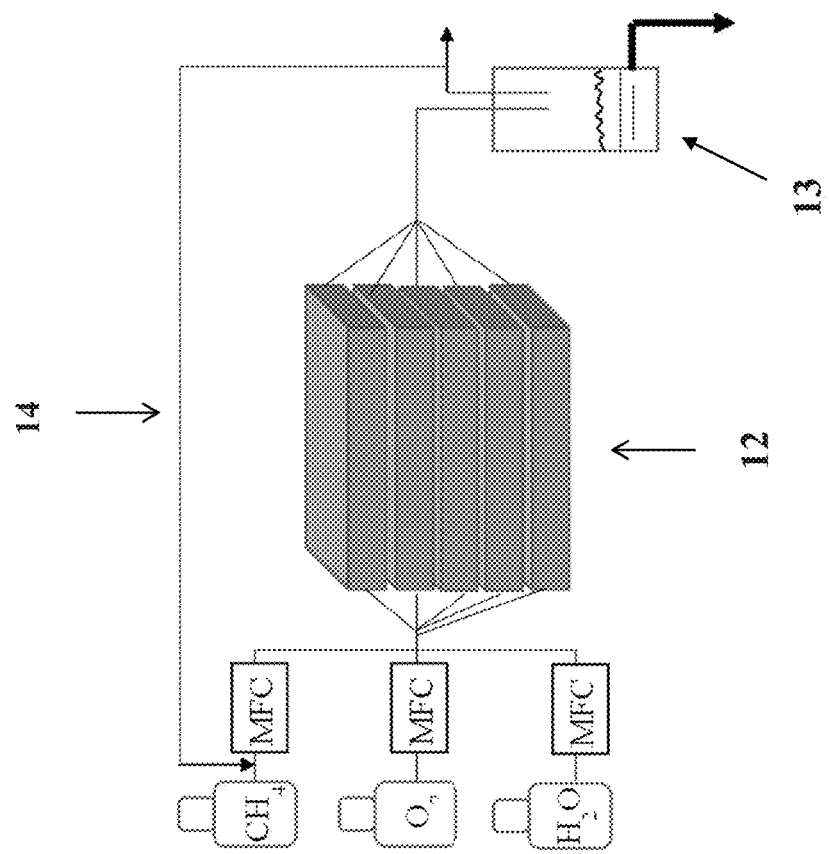
FIG. 8 illustrates a possible manner of scaling up the process of the present invention.

The process described in the present invention for DMTM can be scaled up by stacking DMTM devices in series as schematically illustrated in FIG. 8. In analogy with scalable perovskite/Copper Indium Gallium di-Selenide Cu(In,Ga)Se$_2$ (CIGS) solar modules, a scalable interconnection scheme that can accommodate scale-up towards square meter scale, thin film in a multi junction module architecture can be applied to a DMTM electrochemical device as described above. Printable electronic ink using conventional printing presses can also be utilized. Fabrication of a large area of uniformly thin oxide layer is insurmountable. However, the silicon oxide layer, used in the general embodiment of the present invention as an insulator layer, can be replaced with a "high-kappa" "high-κ" dielectric material such as TiO$_2$, which makes it possible to have a thicker insulator and thus a larger active area can be manufactured. That is less challenging than doing the same with a thinner layer that is required to be uniform and defect free. However, an advantage in the present invention is that the uniformity of the oxide insulator layer is not a crucial requirement as is the case with prior art. Moreover, in one embodiment the whole oxide insulator layer was skipped and emission of hot electrons was still observed. In that particular embodiment, fabrication of devices with much larger area should be more feasible.

EXAMPLES

The following examples illustrate but do not limit the utility of the present process to oxygenate methane.

Example 1

A schematic representation of a methane to methanol device unit as one of the embodiments of the present invention is shown in FIG. 7. The schematic drawing shows a batch-like flow reactor where the reaction starts and ends with on-off switching of the electric field. In an experimental setup, the hot-electron emitting device was placed on a hot plate calibrated with a thermocouple so that the temperature would reach either 25 or 45° C. The gas phase was prepared as $CH_4/H_2O/O_2$ in a 60%:20%:20% ratio, respectively. The gas mixture was loaded into gas-tight 50-ml syringes 11. The syringes were loaded into syringe pumps and the gas was delivered at different rates. The maximum flow rate delivered by the pump used (Harvard Apparatus syringe pump, model PHD 22/2000) was 3.68 mL/sec, with the potential to increase that flow rate several fold under an upgraded system. The gas in the outlet tubing passed through a condenser and was kept on ice to minimize evaporation of methanol. A fraction of the liquid was taken for NMR analysis.

FIG. 8 shows a possibility of scaling up the process of the present invention using multiple units according to the embodiment in FIG. 7, i.e. based on stacking of hot-electron catalytic devices. Catalytic devices are first horizontally assembled into one operating unit. For example, a 4 inch (100 mm)-diameter operating unit accommodates 20 devices of 1 cm2 active area each with the realization that areas on the edges of a wafer, as well as gaps in-between devices are not used. A 300 mm-diameter (12 inch) wafer and 450 mm-diameter (17.7 inch) wafer will accommodate 254 and 611 devices, respectively. Operating units can then be stacked up vertically to maximize the accumulated active area to reach square-meters scale of active areas. Mass flow controllers (MFC) are provided as shown to control the input flows. The operating unit 12 accommodates a number of horizontally assembled devices, and a condensation and separating unit 13 is provided for product recovery. A recycle line 14 for unreacted starting material may be provided as shown.

Figure 9:
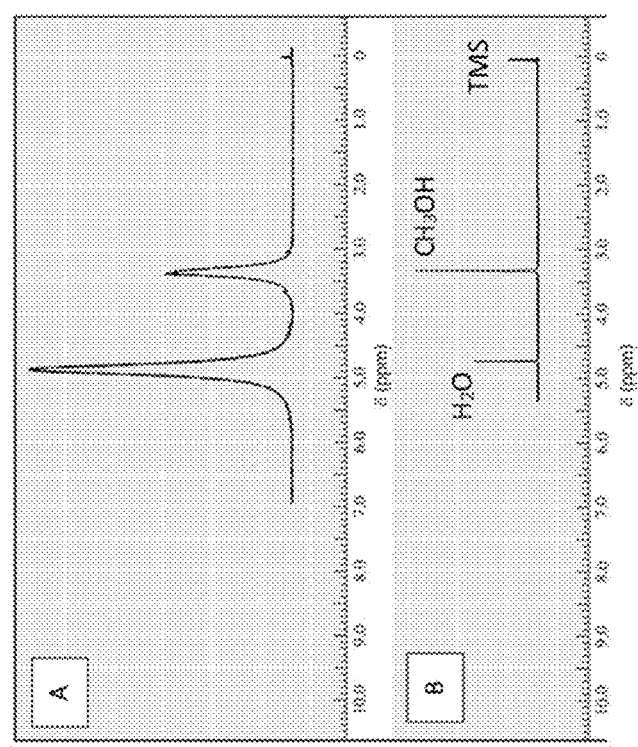
FIG. 9 shows the characterization by NMR of the product of the process of the present invention, showing $CH_3OH$ as the only product in the liquid phase.

Product characterization of $CH_4$ oxidation, showing $CH_3OH$ as the only product in the liquid phase is shown in FIG. 9, showing an $^1$H-NMR spectrum of the condensate from the oxidation products that exited the reaction cell (DMTM device). The liquid products were characterized using a Varian INOVA 500-MHz NMR spectrometer. $^1$H-NMR of $CH_3OH$ in 0.1% $H_2O/D_2O$ was used as standard. Tetramethylsilane (TMS) was used as the internal standard to calibrate chemical shift for $^1$H in the horizontal axis. Unlike the spectrum shown in FIG. 9, the water signal (when unsuppressed) is conventionally too large to be on scale and thus it is typically truncated to make the signals of solutes visible on scale. Although the signal intensities in our NMR spectrum are non-quantitative, and since both water and methanol resonances are on scale, the spectrum is clearly suggestive of water and methanol being present in comparable amounts.

Example 2

Figure 10:
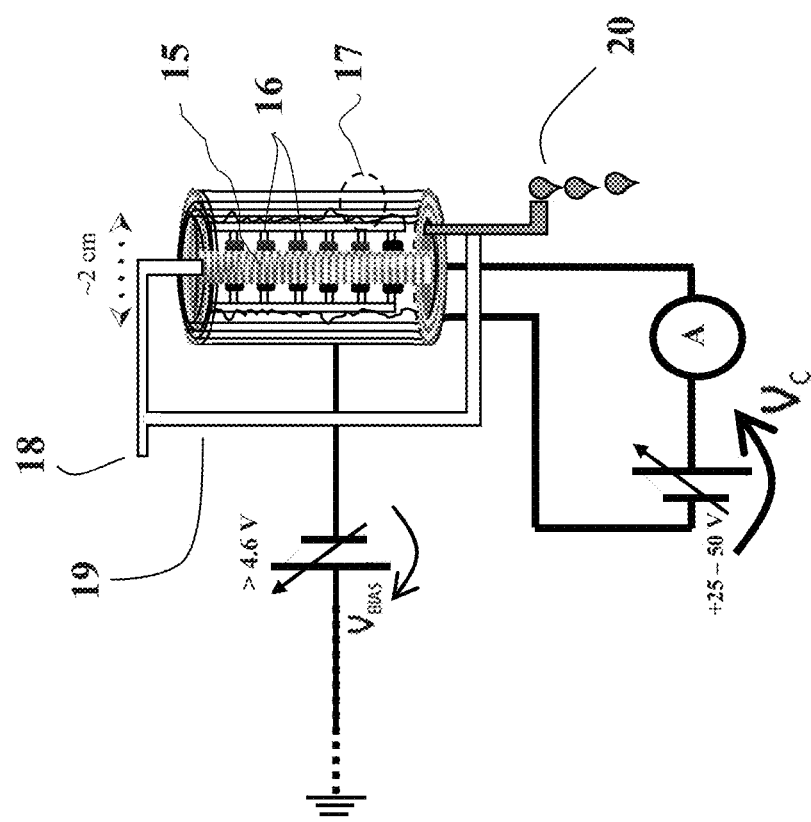
FIG. 10 shows an embodiment of the present invention where the planar geometry of the electrodes in FIGS. 6-8 is replaced by a tubular, cylindrical geometry in the form of a column.

FIG. 10 represents a tubular "cylindrical" geometry as opposed to the planar geometry of the electrodes of the DMTM device of Example 1. The device features a spiral central anode 15 with horizontal gas delivery pipes 16. A cathodic MP/MIZ or MP/MZ heterostructure 17 with zeolite or zeolite-like material on the internal side (denoted by a corrugated line) was provided in a tubular configuration surrounding the central anode, at a distance of about 2 cm. A gas mix inlet 18 and a recycle line 19 for unreacted starting material are provided. Condensed product is recovered at outlet 20.

This geometry was pursued under the general expectation to have more symmetrical distribution of the reacting gas mix inside the device (as opposed to asymmetrically distribution in a rectangular device). However, unexpectedly, when the surface areas for the planar and tubular geometry were the same, the latter geometry showed enhanced emission of energetic electrons. This was inferred from the ability to increase the distance between the cathode and anode, which would be otherwise non- or less functional in a rectangular device, and yet obtain a functional device that produced a similar qualitative NMR $^1$H-NMR spectrum (FIG. 9) of the condensate from the oxidation products that exited the device (reaction cell). Perhaps that functional enhancement is attributed to new parameters introduced in the cylindrical "tubular" geometry, such as axial magnetic field plays a vital part in the Penning discharge and arc current, which might have enhanced the emissions of hot electrons.

An advantage in the present invention is that the heterogeneous electric field that induces the generation of hot electrons is created within the zeolite structure around catalytic active centers, due to the heterogeneity of zeolite internal channels that may have complemented that heterogeneity in surface topology. On the contrary, in the prior art a heterogeneous electric field, to which enhancement of hot electron emission was attributed, was introduced only on the surface.

The heterogeneity of the electric field was further enhanced by using a spiral central anode. An alternative alteration would be changing the electric field contour of the anode by means of introducing polymeric pillars, triangular or sharp-edged protrusions. It must be understood that no parameter in the system is expected to act independently, but rather in interaction with other parameters, due to the extreme sensitivity of the electro-kinetic system toward several design parameters, the thickness of top layer, electrode spacing, topological heterogeneity and electrode geometry of electrodes. etc. That leads to the realm of unexpected possibilities, all under the spirit and scope of the present invention to empirically optimize the hot electron-based partial oxidation of methane to methanol as well as other applicable oxidation reactions.

Different Oxygenation Reactions

The device and process described in the present invention operate under variable "interconnected" parameters, which can be altered, by those having ordinary skill in the art, within the scope of the present invention to produce different commercially variable oxygenated products or by-products such as formaldehyde. The changeable parameters include:

the molar ratio of oxygen and water;

flow rate, use of internal geometric baffles to increase the residence time for reactants;

using different types of carbonaceous supporting material including graphene and carbon nanotube;

doping zeolites with Cesium (Cs) (commonly known as cesiation to improve emissivity or different alkaline metals characterized by a very low work function;

using non-ambient conditions;

partial filling of zeolite internal structures with nanoparticle catalysts.

What is claimed is:

1. A method for converting methane to methanol, comprising the steps of:
    providing a structure comprising:
        a multi-layer cathode having a backside and a front side, said cathode comprising the following layers in the following order from the backside towards the front side: a conductive metal layer, a wide-band gap layer, a cathodic conductive layer, an optional insulator layer, and a porous support layer incorporating catalytic transition metal centres, wherein the porous support material is a zeolite layer, a zeolite-like material or a carbonaceous material and wherein the transition metal atoms in said centres are pairwise bridged by an oxygen atom during operation;
        an anode positioned at a distance from and facing the cathode front side;
        a first node conductively connected to the cathodic conductive layer and a second node conductively connected to the anode;
    applying a first bias voltage to the first node and a second bias voltage to the second node, generating hot electrons;
    directing said hot electrons towards the porous support;
    conveying a stream comprising methane to the porous support; and
    recovering methanol from a stream leaving the porous support.

2. The method of claim 1, wherein the structure comprises an additional electric circuit comprising a node conductively connected to the backside conductive metal layer, and a negative bias voltage is applied to that node, causing the shuttling of holes, whereby that negative bias voltage is provided by a voltage source having a negative end connected to the backside conductive metal layer and a positive end connected to a ground potential or to the anode.

3. The method of claim 1, wherein the metal in the catalytic transition metal centres are Fe, Cu or mixtures of these.

4. The method of claim 1 wherein the conductive metal layer is an aluminium layer.

5. The method of claim 1 wherein wide-band-gap layer is a NiOx layer.

6. The method of claim 1 wherein the cathodic conductive layer is a silicon or aluminium layer.

7. The method of claim 1 wherein the optional insulator layer is a silicon dioxide or aluminium oxide layer.

8. The method of claim 1 wherein the porous support material layer comprises at least one material selected from the group consisting of carbon nanotubes, graphene and fullerenes.

9. The method of claim 1, wherein unreacted hydrocarbon is recovered from the stream leaving the porous support and recycled to the stream conveyed to the porous support.

10. The method of claim 1, wherein the structure further comprises at least one cathode terminal conductively connected to the cathode and at least one anode terminal conductively connected to the anode.

11. A device for converting methane to methanol, comprising:
    a multi-layer cathode having a backside and a front side, said cathode comprising the following layers in the following order from the backside towards the front side: a conductive metal layer, a wide-band gap layer, a cathodic conductive layer, an optional insulator layer, and a porous support layer incorporating catalytic transition metal centres, wherein the porous support material layer is a zeolite layer, a zeolite-like material or a carbonaceous material and wherein the transition metal atoms in said centres are pairwise bridge by an oxygen atom;
    an anode positioned at a distance from and facing the cathode front-side;
    flow controller for conveying a stream comprising a hydrocarbon to the porous support;
    condensing and separating unit for recovering product from a stream leaving the porous support; and
    an electric circuit comprising at least one cathode terminal conductively connected to the cathodic conductive layer and at least one anode terminal conductively connected to the anode.

12. The device according to claim 11, further comprising an additional electric circuit comprising a node conductively connected to the conductive metal layer.

13. The device of claim 11, wherein the metal in catalytic transition metal centres are Fe, Cu or mixtures of these.

14. The device of claim 11, wherein the conductive metal layer is an aluminium layer.

15. The device of claim 11 wherein the wide-band-gap layer is a NiOx layer.

16. The device of claim 11, wherein the cathodic conductive layer is a silicon or aluminium layer.

17. The device of claim 11, wherein the optional insulator layer is a silicon dioxide or aluminium oxide layer.

18. The device of claim 11, wherein the porous support material layer comprises at least one material selected from the group consisting of carbon nanotubes, graphene and fullerenes.

19. The device of claim 11, wherein the multi-layered cathode is planar.

20. The device of claim 11, wherein the multi-layered cathode is cylindrical.

* * * * *